(12) United States Patent
Sharma et al.

(10) Patent No.: US 9,070,489 B2
(45) Date of Patent: Jun. 30, 2015

(54) MIXED PHASE LITHIUM METAL OXIDE COMPOSITIONS WITH DESIRABLE BATTERY PERFORMANCE

(71) Applicant: Envia Systems, Inc., Newark, CA (US)

(72) Inventors: Sanjeev Sharma, Fremont, CA (US); Subramanian Venkatachalam, Pleasanton, CA (US); Yogesh Kumar Anguchamy, Newark, CA (US); Herman A. Lopez, Sunnyvale, CA (US); Sujeet Kumar, Newark, CA (US)

(73) Assignee: Envia Systems, Inc., Newark, CA (US)

(*) Notice: Subject to any disclaimer, the term of this patent is extended or adjusted under 35 U.S.C. 154(b) by 183 days.

(21) Appl. No.: 13/747,735

(22) Filed: Jan. 23, 2013

(65) Prior Publication Data
US 2013/0202953 A1    Aug. 8, 2013

Related U.S. Application Data

(60) Provisional application No. 61/595,993, filed on Feb. 7, 2012.

(51) Int. Cl.
*H01B 1/08* (2006.01)
*H01M 4/131* (2010.01)
(Continued)

(52) U.S. Cl.
CPC .......... *H01B 1/08* (2013.01); *H01M 4/131* (2013.01); *Y02E 60/122* (2013.01); *H01M 4/366* (2013.01);
(Continued)

(58) Field of Classification Search
CPC ............. H01B 1/00; H01B 1/08; H01M 4/02; H01M 4/131; H01M 4/505; C01G 45/02
USPC .......... 252/518.1, 521.2; 429/218.1, 223, 224
See application file for complete search history.

(56) References Cited

U.S. PATENT DOCUMENTS 5,658,693 A    8/1997 Thackeray et al.
5,674,645 A    10/1997 Amatucci et al.
(Continued)

FOREIGN PATENT DOCUMENTS

EP    2264814 A1    12/2010
JP    57065674      4/1982
(Continued)

OTHER PUBLICATIONS

JP 2007-220630 (pub date Aug. 2007) English language translation.*
(Continued)

*Primary Examiner* — Mark Kopec
(74) *Attorney, Agent, or Firm* — Dardi & Herbert, PLLC; Peter S. Dardi

(57) ABSTRACT

Mixed phase complex lithium metal oxides are described with an overall stoichiometry represented by a formula $Li_{1+a}Ni_bCo_cMn_dO_x$, $-0.05 \le a \le 0.14$, $0.1 \le b \le 0.25$, $0 \le c \le 0.2$, $0.45 \le d \le 0.8$, $a+b+c+d=1$ and $(1+a)/(b+c+d) \le 1.325$. The compositions are generally very high in manganese content. The compositions can have x-ray diffractograms and differential capacity profiles suggesting the presence of a layered ($Li_2MnO_3$)—layered ($LiMetalO_2$)—spinel crystal structure. The compositions can exhibit surprisingly low first cycle irreversible capacity losses while maintaining high specific discharge capacities, even at high discharge rates. Stabilizing coatings have been found to further significantly improve performance.

24 Claims, 10 Drawing Sheets

(51) Int. Cl.
   *H01M 4/36* (2006.01)
   *H01M 4/505* (2010.01)
   *H01M 4/525* (2010.01)
   *H01M 4/62* (2006.01)
   *C01G 53/00* (2006.01)
   *B82Y 30/00* (2011.01)

(52) U.S. Cl.
   CPC .............. *H01M 4/505* (2013.01); *H01M 4/525* (2013.01); *H01M 4/62* (2013.01); *C01G 53/44* (2013.01); *C01G 53/50* (2013.01); *C01P 2002/52* (2013.01); *C01P 2002/60* (2013.01); *C01P 2002/72* (2013.01); *C01P 2002/74* (2013.01); *C01P 2004/64* (2013.01); *C01P 2006/11* (2013.01); *B82Y 30/00* (2013.01)

(56) References Cited

U.S. PATENT DOCUMENTS

| | | |
|---|---|---|
| 6,037,095 A | 3/2000 | Miyasaka |
| 6,087,042 A | 7/2000 | Sugiyama et al. |
| 6,168,887 B1 | 1/2001 | Dahn et al. |
| 6,183,718 B1 | 2/2001 | Barker et al. |
| 6,248,477 B1 | 6/2001 | Howard, Jr. et al. |
| 6,251,822 B1 | 6/2001 | Peng et al. |
| 6,322,744 B1 | 11/2001 | Kelley et al. |
| 6,372,385 B1 | 4/2002 | Kweon et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,749,648 B1 | 6/2004 | Kumar et al. |
| 6,872,491 B2 | 3/2005 | Kanai et al. |
| 6,964,828 B2 | 11/2005 | Lu et al. |
| 7,078,128 B2 | 7/2006 | Lu et al. |
| 7,135,252 B2 | 11/2006 | Thackeray et al. |
| 7,205,072 B2 | 4/2007 | Kang et al. |
| 7,285,357 B2 | 10/2007 | Jordy et al. |
| 7,303,840 B2 | 12/2007 | Thackeray et al. |
| 7,351,494 B2 | 4/2008 | Hennige et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,517,613 B2 | 4/2009 | Yuasa et al. |
| 7,556,655 B2 | 7/2009 | Dahn et al. |
| 7,674,557 B2 | 3/2010 | Sun et al. |
| 7,927,506 B2 | 4/2011 | Park |
| 7,935,270 B2 | 5/2011 | Park |
| 8,557,440 B2 * | 10/2013 | Yu et al. .................. 429/231.1 |
| 2002/0055042 A1 | 5/2002 | Kweon et al. |
| 2002/0114995 A1 | 8/2002 | Thackeray et al. |
| 2003/0082448 A1 | 5/2003 | Cho et al. |
| 2003/0087155 A1 | 5/2003 | Cho et al. |
| 2003/0108790 A1 | 6/2003 | Manthiram et al. |
| 2004/0076884 A1 | 4/2004 | Lee et al. |
| 2004/0091779 A1 | 5/2004 | Kang et al. |
| 2004/0234856 A1 | 11/2004 | Morigaki et al. |
| 2005/0164082 A1 | 7/2005 | Kishi et al. |
| 2005/0202316 A1 | 9/2005 | Hwang et al. |
| 2005/0220700 A1 | 10/2005 | Suhara et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |
| 2007/0122703 A1 | 5/2007 | Whitfield et al. |
| 2007/0160906 A1 | 7/2007 | Tooyama et al. |
| 2007/0202405 A1 | 8/2007 | Shizuka et al. |
| 2007/0212607 A1 | 9/2007 | Fujihara et al. |
| 2007/0292757 A1 | 12/2007 | Watanabe et al. |
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2008/0280205 A1 | 11/2008 | Jiang et al. |
| 2009/0087362 A1 | 4/2009 | Sun et al. |
| 2009/0127520 A1 | 5/2009 | Whitfield et al. |
| 2009/0155694 A1 | 6/2009 | Park |
| 2009/0170003 A1 | 7/2009 | Chen et al. |
| 2009/0263707 A1 | 10/2009 | Buckley et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2010/0233550 A1 | 9/2010 | Yanagida et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |
| 2012/0107680 A1 | 5/2012 | Amiruddin et al. |
| 2012/0295155 A1 | 11/2012 | Deng et al. |
| 2013/0202953 A1 | 8/2013 | Sharma et al. |

FOREIGN PATENT DOCUMENTS

| | | |
|---|---|---|
| JP | 06-243871 | 9/1994 |
| JP | 09-045373 | 2/1997 |
| JP | 10-255837 | 9/1998 |
| JP | 3112138 | 9/2000 |
| JP | 3276451 | 2/2002 |
| JP | 2002-110167 | 4/2002 |
| JP | 3506397 | 12/2003 |
| JP | 2006-134816 | 5/2006 |
| JP | 2006-344425 | 12/2006 |
| JP | 2007-220630 A | 8/2007 |
| JP | 2008-536285 | 9/2008 |
| JP | 2008-258160 A | 10/2008 |
| JP | 5023541 | 6/2012 |
| KR | 10-2002-0026655 A | 4/2002 |
| KR | 10-2005-0111764 | 11/2005 |
| KR | 10-0578877 | 5/2006 |
| KR | 10-2007-0117827 A | 12/2007 |
| KR | 10-0796953 B1 | 1/2008 |
| KR | 10-2008-0031616 A | 4/2008 |
| KR | 10-0822013 | 4/2008 |
| KR | 10-2008-0099132 A | 11/2008 |
| KR | 10-2009-0078128 A | 7/2009 |
| WO | 99/60638 A2 | 11/1999 |
| WO | 01/35473 A1 | 5/2001 |
| WO | 01/91209 A1 | 11/2001 |
| WO | 20041084330 A2 | 9/2004 |
| WO | 2006/025707 A1 | 3/2006 |
| WO | 2006/109930 A1 | 10/2006 |
| WO | 2006/137673 A1 | 12/2006 |

(56) References Cited

FOREIGN PATENT DOCUMENTS

| | | |
|---|---|---|
| WO | 2008/086041 A1 | 7/2008 |
| WO | 2011-056847 A2 | 5/2011 |

OTHER PUBLICATIONS

Ho et al., "Application of A-C Techniques to the Study of Lithium Diffusion in Tungsten Trioxide Thin Films," J. Electrochem. Soc., 1980; 127(2):343-350.

Hong et al., "Structural evolution of layered Li1.2Ni0.2Mn0.6O2 upon electrochemical cycling in a Li rechargeable battery," J. Mater. Chem., 2010, 20, 10179-10186.

Hwang et al. "Influence of Mn content on the morphology and electrochemical performance of LiNi1-x-yCoxMnyO2 cathode materials," J. Mater. Chem., 2003; 13:1962-1968.

Ito et al., "The relationship between crystal structure and the electrochemical reaction of Li-rich insertion materials (2)" 2010.

Ito et al., "Cyclic deterioration and it's improvement for Li-rich layered cathode material Li [Ni0.17Li0.2Co0.07Mn0.56]O2," Journal of Power Sources, 195: 567-573 (2010).

Ito et al., "A new approach to improve the high-voltage cyclic performance of Li-rich layered cathode material by electrochemical pretreatment," Journal of Power Sources 183: 344-346 (2008).

Johnson et al., "Lithium-manganese oxide electrodes with layered-spinel composite structures xLi2MnO3. (1-x)Li1+yMn2-yO4 (0<x<1, 0≤y≤0.33) for lithium batteries," Electrochemistry Communications 7 (2005) 528-536.

Johnson et al. "The significance of the Li2MnO3 component in 'composite' xLi2MnO3 • (1-x)LiMn0.5Ni0.5O2 electrodes," Electrochemistry Communications 6 (2004) 1085-1091.

Kang et al., "Enhancing the rate capability of high capacity xLi2MnO3 • (1-x)LiMO2 (M=Mn, Ni, Co) electrodes by Li—Ni—PO4 treatment," Electrochemistry Communications 11 (2009) 748-751.

Kang et al., "The Effects of Acid Treatment on the Electrochemical Properties of 0.5 Li2MnO3•0.5 LiNi0.44Co0.25Mn0.31O2 Electrodes in Lithium Cells," Journal of the Electrochemical Society 153(6):A1186-A1192 (2006).

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.

Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152 (9) A1707-A1713 (2005).

Kim et al., "Electrochemical and Structural Properties of xLi2M'O3•(1-x)LiMn0.5O2 Electrodes for Lithium Batteries (M'=Ti, Mn, Zr; 0 ≤x ≤ 0.3)" Chem. Mater. 2004, 16, 1996-2006.

Kim et al., "Electrochemical Stability of Thin-Film LiCoO2 Cathodes by Aluminum—Oxide Coating," Chem. Mater. 2003, 15(7):1505-1511.

Lee et al., "High capacity Li[Li0.2Ni0.2Mn0.6]O2 cathode materials via a carbonate co-precipitation method," J. of Power Sources, 162 (2006), 1346-1350.

Lee et al., "Electrochemical characteristics of Al2O3-coated lithium manganese spinel as a cathode material for a lithium secondary battery," J. Power Sources 126 (2004) 150-155.

Luo et al., "On the incorporation of fluorine into the manganese spinel cathode lattice," Solid State Ionics 180 (2009) 703-707.

Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).

Okumura et al., "Cathode having high rate performance for a secondary Li-ion cell surface-modified by aluminum oxide nanoparticles," J. of Power Sources 189 (2009) 471-475.

Ohsawa et al., "The relationship between crystal structure and the electrochemical reaction of Li-rich insertion materials (1)," 2010.

Park et al., "Physical and electrochemical properties of spherical Li1+x(Ni1/3Co1/3Mn1/3)1-xO2 cathode materials", Journal of Power Sources, 177:177-183 (2008).

Park et al., "Lithium—manganese—nickel—oxide electrodes with integrated layered-spinel structures for lithium batteries," Electrochemistry Communications 9 (2007) 262-268.

Robertson et al., "Mechanism of Electrochemical Activity in Li2MnO3," Chem. Mater. 2003, 15, 1984-1992.

Shin et al., "Improvement of electrochemical properties of Li[Ni0.4Co0.2Mn(0.4-x)]O2-yFy cathode materials at high voltage region", Electrochimica Acta 52: 1477-1482 (2006).

Song et al., "Two- and three-electrode impedance spectroscopy of lithium-ion batteries," J. of Power Sources, 2002; 111:255-267.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "The preparation and electrochemical performance of solid solutions LiCoO2—Li2MnO3 as cathode materials for lithium ion batteries," J of Power Sources 159 (2006) 1353-1359.

Sun et al., "Significant Improvement of high voltage cycling behavior AlF3-coated LiCoO2 cathode," Electrochemistry Communications 8 (2006) 821-826.

Thackeray et al., "Li2MnO3-stabilized LiMO2 (M=Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn,Ni,Co) for lithium batteries," Electrochemistry Communications 8 (2006), 1531-1538.

Thackeray et al., "Advances in manganese—oxide 'composite' electrodes for lithium-ion batteries," J. Mater. Chem., 2005,15, 2257-2267.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Yabuuchi et al., "Detailed Studies of a High-Capacity Electrode Material for Rechargeable Batteries, Li2MnO3—LiCo1/3Ni1/3Mn1/3O2," J. Am. Chem. Soc. 2011, 133, 4404-4419.

Yabuuchi et al., "Study of Li2MnO3—Li(Co1/3Ni1/3Mn1/3)O2 for High Capacity Positive Electrode Material: II. Redox Reaction at the Positive Electrode/Electrolyte Interface," 2010.

Yoshii et al., "Study of Li2MnO3—Li(Co1/3Ni1/3Mn1/3)O2 for High Capacity Positive Electrode Material: I. Change in the Crystal and Electronic Structure upon Li de-intercalation," 2010.

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Fey et al., "Saturated linear dicarboxylic acids as chelating agents for the sol-gel synthesis of LiNi0.8Co0.2O2," Materials Chemistry and Physics 87 (2004) 246-255.

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

Aurbach et al., "On the capacity fading of LiCoO2 intercalation electrodes: the effect of cycling, storage, temperature, and surface film forming additives," Electrochimica Acta 47 (2002) 4291-4306.

Boulineau et al., "Reinvestigation of Li2MnO3 Structure: Electron Diffraction and High Resolution TEM," Chem. Mater. 2009, 21, 4216-4222.

(56) References Cited

OTHER PUBLICATIONS

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid-State Letters, 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of The Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina drived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Kang et al., "Development of high-capacity cathode materials with integrated structures," DOE Vehicle Technology Prorogram Annual Merit Review, EERE, 14 pages, (May 2009).

Search Report and Written Opinion for corresponding International Patent Application No. PCT/US2013/024775, mailed May 27, 2013.

\* cited by examiner

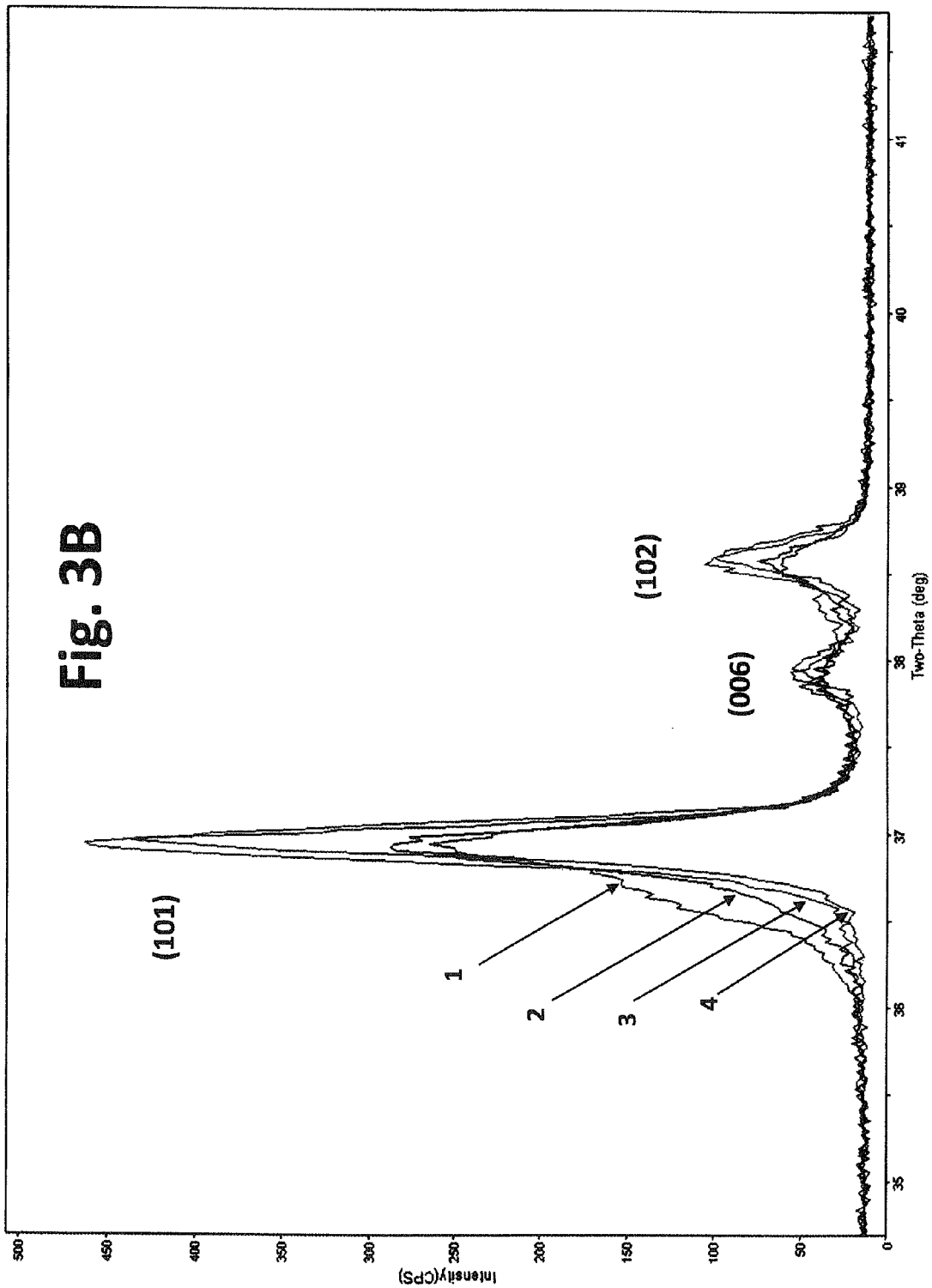

MIXED PHASE LITHIUM METAL OXIDE COMPOSITIONS WITH DESIRABLE BATTERY PERFORMANCE

CROSS REFERENCE TO RELATED APPLICATIONS

This application claims priority to U.S. patent application 61/595,993 filed Feb. 7, 2012 to Sharma et al., entitled "Mixed Phase Lithium Metal Oxide Compositions With Desirable Battery Performance," incorporated herein by reference.

FIELD OF THE INVENTION

The invention relates to desirable compositions of complex multiphase lithium mixed metal oxides that provide extremely desirable performance properties.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium or alloys with lithium. For some current commercial batteries, the negative electrode material can be graphite, and the positive electrode material can comprise lithium cobalt oxide ($LiCoO_2$). In practice, only roughly 50% of the theoretical capacity of the cathode can be used, and even a lower percentage is available for longer cycling. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries can be classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity. However, for either category of materials, the batteries should be able to operate at relatively high rates of discharge for period of time.

SUMMARY OF THE INVENTION

In a first aspect, the invention pertains to a composition having a formula $Li_{1+a}Ni_bCo_cMn_dM_eO_x$, with $-0.05 \leq a \leq 0.14$, $0.1 \leq b \leq 0.25$, $0 \leq c \leq 0.2$, $0.45 \leq d \leq 0.8$, $0 \leq e \leq 0.02$, $a+b+c+d+e=1$, $(1+a)/(b+c+d+e) \leq 1.34$ and M is a metal element different from Li, Ni, Co and Mn. The composition can exhibit a first cycle irreversible capacity loss in a lithium battery of no more than about 14% of the first charge specific capacity when discharged at C/20 from 4.6V to 2V.

In a further aspect, the invention pertains to a composition having a formula $Li_{1+a}Ni_bCo_cMn_dM_eO_x$, $-0.05 \leq a \leq 0.14$, $0.1 \leq b \leq 0.25$, $0 \leq c \leq 0.2$, $0.45 \leq d \leq 0.8$, $0 \leq e \leq 0.02$, $a+b+c+d+e=1$, $(1+a)/(b+c+d+e) \leq 1.325$ and M is a metal element different from Li, Ni, Co, and Mn. In some embodiments, the composition can exhibit a 50th cycle specific discharge capacity of at least about 150 mAh/g at a discharge rate of 2 C when discharged from 4.6V to 2V.

In additional aspects, the invention pertains to a composition having a formula $Li_{1+a}Ni_bCo_cMn_dM_eO_x$, $-0.05 \leq a \leq 0.14$, $0.1 \leq b \leq 0.25$, $0 \leq c \leq 0.2$, $0.45 \leq d \leq 0.8$, $0 \leq e \leq 0.02$, $a+b+c+d+e=1$, $(1+a)/(b+c+d+e) \leq 1.325$ and M is a metal element different from Li, Ni, Co, and Mn. In some embodiments, the composition exhibits an X-ray diffractogram indicating the presence of a spinel phase and a 5th cycle discharge specific capacity of at least about 225 mAh/g when discharged at a rate of C/3 from 4.6V to 2V.

BRIEF DESCRIPTION OF THE DRAWINGS

FIG. 3B is an enlarged view of a portion of the plot in FIG. 3A between 36 degrees and 40 degrees, indicating the formation of spinel phase for the lower Li/Me ratio compositions 1 and 2.

DETAILED DESCRIPTION OF THE INVENTION

Figure 1:
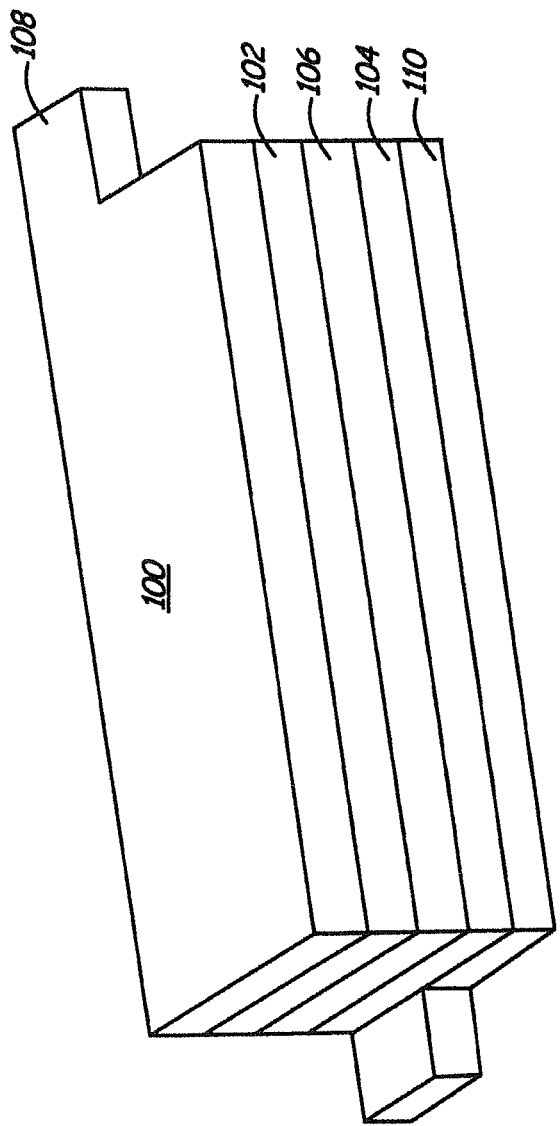
FIG. 1 is a schematic perspective view of an electrode stack useful for the formation of a battery.

Compositions have been discovered for use in lithium based batteries that have mixed crystalline phases with excellent specific capacities, low irreversible capacity loss and evidence of superior cycling properties. The compositions are believed to have at least three phases with layered-layered-spinel crystalline structures. The overall composition is designed to form the desired crystalline phases, and the compositions have been engineered to exhibit desired excellent cycling properties while not sacrificing a high capacity. The materials also exhibit electrochemical activity over desired voltage ranges. To achieve a cycling performance suitable for automotive applications, it is desirable for the batteries to exhibit cycling to 1000 cycles or more with a low drop in capacity and average voltage. The compositions are designed to have a relatively small amount of a layered $Li_2MnO_3$ phase, which can contribute to high capacities at the expense of a high first cycle irreversible capacity loss and cycling instability. Results presented herein suggest that the spinel phase seems to exhibit a high stability without contributing significantly to an irreversible capacity loss in the first cycle. Stabilizing inorganic coatings on the active materials can further contribute to the outstanding performance of the compositions.

The positive electrode materials described herein can be used to construct lithium ion batteries that have a combination of excellent performance parameters. In particular, the materials and corresponding batteries can exhibit excellent cycling, high overall specific capacities, stable moderate average voltages, outstanding rate capability, and low irreversible capacity loss. The resulting lithium ion batteries can be used as an improved power source, particularly for high energy applications, such as electric vehicles, plug in hybrid electric vehicles and the like. Since the compositions are designed to have a spinel component to the multiphased material, the spinel component results in a moderate average voltage, but the average voltage should correspondingly have very good stability with cycling. Evidence for the spinel phase is found in the x-ray diffractograms of the materials as well as in differential plots of the galvanostatic charge-discharge cycling. For extremely long cycling stability, lithium ion batteries are generally cycled over a narrower voltage range than the full accessible voltage window, and the improved materials described herein are designed for improved cycling stability over a broader voltage window, and this expansion of the voltage window can contribute significantly with respect to enhancement of the power output of the battery.

The batteries described herein are lithium-based batteries in which a non-aqueous electrolyte solution comprises lithium ions. For secondary lithium ion batteries during charge, oxidation takes place at the cathode (positive electrode) where lithium ions are extracted and electrons are released. During discharge, reduction takes place in the cathode where lithium ions are inserted and electrons are consumed. If elemental lithium metal itself is used as the anode, the resulting battery generally is simply referred to as a lithium battery. Lithium ion batteries refer to batteries in which the anode, i.e., negative electrode, active material is a material that takes up lithium during charging, generally through intercalation or alloying, and releases lithium during discharging. Unless indicated otherwise, performance values referenced herein are at room temperature.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell. The irreversible capacity loss generally can be attributed to irreversible compositional changes during the initial charge-discharge cycle of the battery materials that may be substantially maintained during subsequent cycling of the battery.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

The density of the compositions generally depends on the composition. The tap density generally depends on the real density and the procedure to form the material. The synthesis approaches described here have been shown to be suitable to form materials with a high tap density. As a result of a relatively high tap density and excellent cycling performance, a battery can exhibit a high total capacity when the active material is incorporated into the cathode.

As noted above, the improved positive electrode materials can demonstrate a reduced proportion of irreversible capacity loss after the first charge and discharge of the battery relative to layered-layered lithium rich materials. The irreversible capacity loss resulting from positive electrode active materials is associated with gas production during the initial charge cycle. Gas production in the battery can complicate battery formation and creates safety issues. Furthermore, to compensate for the full capacity of the positive electrode, the negative electrode capacity may be set according to the full discharge capacity of the positive electrode even though the lost capacity does not result in a cycling capacity. If the IRCL is reduced, a smaller amount of negative electrode material is needed without reducing the cycling capacity. Thus, a reduction in irreversible capacity loss can provide many advantages for commercial battery production. The active materials can have an appropriate coating to provide for an improvement in cycling as well as a further significant reduction in irreversible capacity loss and an increase in specific capacity. Specifically, the positive electrode active materials described herein can have a very low irreversible capacity loss of no more than about 15% of the initial charge capacity and lower in some embodiments, which are extremely low values for high capacity active materials.

The first charge-discharge cycle can be called the formation cycle due to significant composition changes that can take place in the battery associated with both electrodes. For high capacity positive electrode materials, a chemical activation of the materials has been attempted to reduce the IRCL of the material after incorporation into a battery, which would avoid some of the disadvantages described above. Acid leaching of lithium rich lithium metal oxides to activate the material and eliminate irreversible capacity loss is described in Kang et al., "The Effects of Acid Treatment on the Electrochemical Properties of $0.5Li_2MnO_3 \cdot 0.5LiNi_{0.44}Co_{0.25}Mn_{0.31}O_2$ Electrodes in Lithium Cells," J. of the Electrochemical Society 153(6) pp A1186-A1192 (2006). However, the acid leached material seems to undergo additional structural changes from the chemical activation that seems to damage the cycling ability of the material. Since stable cycling is critical for commercial batteries, the chemical activation (acid leach) approach is not a desirable way to reduce irreversible capacity loss. Also, the acid leaching results in an enormous increase in the surface area of the material leading to increased Mn-dissolution which greatly reduces the cycle and calendar life of the battery.

Lithium metal oxides can exhibit an exquisitely complex phase structure, and efforts have been made to take advantage of these complexities in the design of active materials for lithium based batteries. For example, lithium ion batteries can use a positive electrode active material that is lithium rich relative to a reference homogenous electroactive lithium metal oxide composition with a layered-layered mixed phase crystal structure. In particular, it is believed that in some embodiments of lithium rich materials, a $Li_2MO_3$ material may be structurally integrated with either a layered LiM'O$_2$ component, in which a reference structure has M and M' being manganese, although particular compositions have a portion of the manganese cations substituted with other transition metal cations with appropriate oxidation states. In some embodiments, the positive electrode material can be represented in two component notation as xLi$_2$M"O$_3$.(1-x)LiM'O$_2$ where M' is one or more metal cations with an average valance of +3, and where M" is one or more metal cations with an average valance of +4. Generally, for compositions of particular interest, M" can be considered to be Mn. The general class of compositions are described further, for example, in U.S. Pat. No. 6,680,143 (the '143 patent) to Thackeray et al., entitled "Lithium Metal Oxide Electrodes for Lithium Cells and Batteries," incorporated herein by reference and in published U.S. patent application 2010/0086853A ('853 application) to Venkatachalam et al., entitled "Positive Electrode Materials for Lithium Ion Batteries Having a High Specific Discharge Capacity and Processes for the Synthesis of These Materials," incorporated herein by reference.

The layered-layered mixed phase materials have been studied in some detail with respect to the structure. The crystal structures of the phases are similar, but the distinct phases can be identified by x-ray diffraction with good resolution and using high resolution transmission electron micrographs. Furthermore, phase impurities can further complicate both the analysis of the crystal structure as well as electrochemical performance. Improved processing to obtain high crystallinity and presumably greater phase purity is believed to improve the performance of the material in a battery, which is believed to result in the improved performance noted in the '853 application cited above. The complex phase structure and analysis of the phase structures of the layered-layered materials is described in an article to Thackeray et al., "Comments on the Structural Complexity of Lithium-Rich Li$_{1+x}$M$_{1-x}$O$_2$ Electrodes (M-Mn, Ni, Co) for Lithium Batteries," Electrochemistry Communications 8 (2006) 1531-1538, incorporated herein by reference.

The materials described herein are believed to have a mixed phase structure with at least three phases intermixed. Specifically, the phases are believed to be layered (Li$_2$MnO$_3$)—layered (LiMO$_2$)—spinel (Li$_{1+y}$Mn$_{2-z}$O$_4$) phases, where the compositions in parentheses are approximate representations of the particular phases. Several spinel phases of lithium manganese oxide are known, such as LiMn$_2$O$_4$, Li$_4$Mn$_5$O$_{12}$ and Li$_2$Mn$_4$O$_9$, with manganese having a valence between 3.5 and 4. In general, the spinel phases have a ratio of lithium to non-lithium metal that is lower relative to a reference LiMnO$_2$ material, so that these phases are in some sense lithium deficient. Thus, consistent with x-ray diffraction results, there are believed to be three phases, a lithium rich phase (Li$_2$MnO$_3$), a lithium neutral phase (LiMO$_2$) and a lithium deficient phase (lithium manganese oxide spinel). The overall compositions may or may not be lithium rich relative to the reference LiMO$_2$ composition.

The compositions of interest herein comprise manganese, nickel and optionally cobalt transition metals along with an optional dopant metal, generally up to about 2 percent of the non-lithium metal. Manganese plays a special role due in part to the large number of accessible oxidation states and to the likely importance of manganese for all of the crystal phases. Lithium of course also plays a significant role in allocation of the metals into the various phases. Oxygen generally allocates itself in the structure as needed to obtain electrical neutrality based on the oxidation states of the metals. Generally one or more steps of the synthesis is performed in an oxygen environment, so oxygen is available to adjust to the oxidation states of the metal cations and the crystal structure correspondingly adjusts consistent with the oxidation states and thermodynamic stabilities adjusting for a rich range of parameters.

The lithium metal oxide compositions can be written in various equivalent notations. In some embodiments the formula of the active material described herein can therefore be written as Li$_{1+a}$Ni$_b$Co$_c$Mn$_d$M$_e$O$_{2\pm\delta}$, where M is a dopant metal element and δ is an unknown variable that allows for the possible adjustment of the oxygen content to provide for electrical neutrality for a given oxidation state of the metal cations. A significant number of parameters, such as the relative amounts of metal ions, the oxidative environment, the temperature, the starting materials, and the electronegativity of the metals, influence the determination of the charge of the metal ions and the corresponding amount of oxygen in the product lithium metal oxide composition. While the amount of oxygen incorporated into the composition is not determined during synthesis, elemental analysis generally is also directed to the metal elements of the composition such that the oxygen content is not measured in the product composition.

In the embodiments of particular interest, the active compositions have a formula Li$_{1+a}$Ni$_b$Co$_c$Mn$_d$M$_e$O$_x$, −0.05≤a≤0.14, 0.1≤b≤0.25, 0≤c≤0.2, 0.45≤d≤0.8, 0≤e≤0.02. For simplicity, the above parameter 2±δ has been rewritten as x, where x adjusts according to the oxidation states of the metals that are generated during the synthesis of the compositions. M is a dopant metal element or a combination thereof different from Li, Mn, Co and Ni. The amounts of metal are normalized to be a+b+c+d+e=1. The dopant element or elements M are selected to have a dopant metal component with a value of no more than 0.02 or 2 percent of the total metal a+b+c+d+e excluding the reference lithium. However, note that "a" can be negative as indicated in the range above. The compositions of non-lithium metals can be characterized by the relative values of b, c, d and e, and another important parameter is the relative amounts of lithium and non-lithium metals with (1+a)/(b+c+d+e)≤1.325 in some embodiments. Thus, these compositions have relatively low amounts of lithium ranging from slight lithium deficiencies to modest excess lithium relative to a reference LiMO$_2$ composition. These amounts of lithium are consistent with relatively small amounts of a layered Li$_2$MnO$_3$ phase. Along with the relatively small amounts of lithium, the compositions have relatively large amounts of manganese relative to the other transition metals. The presence of larger amounts of manganese along with relatively low amounts of lithium should encourage the formation of spinel phases of lithium manganese oxide.

The amounts of metal atoms can generally be determined using analytical techniques, and the examples below present results based on inductively coupled plasma approaches (ICP-AES). While in principle, the amount of oxygen can be determined by analytical techniques, in practice quantification of the oxygen in the samples is currently very difficult if possible at all on a practical level. Also, measurements on the oxidation states of the metals, which can be used to indirectly determine the amount of oxygen in the composition, are not expected to have enough accuracy for measuring metal ions through the material to provide a meaningful oxygen value. Oxygen measurements can also be distorted by absorbed water associated with the samples.

The formulas can be rewritten in terms of the phases of the compositions thought to be present. For example, the present compositions can be written as xLi$_2$MnO$_3$.yLi(Co$_m$Ni$_n$Mn$_o$)O$_2$.zLi$_{1+p}$Mn$_{2-q}$O$_4$, where m+n+o=1 and a spinel phase, which is left unspecific referencing parameters p, q. However, the fact that both forms of equations can be so written consistent with the overall metal composition does not mean that the phases are really as written for many reasons. The fundamental reason is that the parameters are underdetermined based on the number of parameters relative to the number of established parameters. In particular, based on relative amounts of metal, the metal ions can distribute within the phases in a large number of ways. Additional reasons include the fact that the amount of oxygen is not known and the formula of the spinel is not known. Thus, writing a composition in multiple phase notation does not imply that the composition actually has such phases.

In general, a considerable amount of work has been performed with complex lithium metal oxides based on an assumption that the stoichiometry corresponds to the added metals introduced into the reaction mixture. For solid state synthesis methods, this is likely a good assumption. For co-precipitation methods, such as the techniques described herein, this assumption has now been found to be imprecise, which can be a more significant issue for the proper selection of a three phase material. Thus, metal levels have been determined directly for the product materials using inductively coupled plasma techniques.

Layered-layered-spinel compositions are described in U.S. Pat. No. 7,927,506 to Park (the '506 patent), entitled "Cathode Active Material and Lithium Battery Using the Same," incorporated herein by reference. This patent claims to broadly described compositions in multiphase notation of $xLi_2MO_3 \cdot yLiMeO_2 \cdot zLi_{1+d}M'_{2-d}O_4$, where $0 \leq d \leq 0.33$, $0 < x < 1$, $0 < y < 1$, $0 < z < 1$, $x+y+z=1$, M is selected from Mn, Ti, Zn and combinations thereof, Me is selected from Ti, V, Cr, Mn, Fe, Co, Ni, Cu, Al, Mg, Zr, B and combination thereof, and M' is selected from Ti, V, Cr, Mn, Fe, Co, Ni, Cu, Al, Mg, Zr, B and combinations thereof. However, in the examples of the '506 patent, they use a simplified formula structure of $(0.6-a)Li_{4/3}Mn_{2/3}O_2 \cdot 0.4LiNi_{0.4}Cu_{0.2}Mn_{0.4}O_2 \cdot a/2Li_1Mn_2O_4$ (a=0.02, 0.03, 0.04, 0.05, 0.07 or 0.1) or $0.5Li_{4/3}Mn_{2/3}O_2 \cdot 0.3LiCoO_2 \cdot 0.2Li_{4/6}Mn_{5/6}O_2$, in which the specific spinel phases seem based on an assumption relating to the selected process temperatures. The explicit compositions in the Examples of the '506 patent have very high lithium enrichments corresponding to large fractions of $Li_2MnO_3$ (i.e., $Li_{4/3}Mn_{2/3}O_2$). While the use of the multiple phase notation in the examples of the '506 patent does not necessarily mean that the actual composition has these precise distributions of phases, the large lithium rich compositions would be expected to correspond with large amounts of a $Li_2MnO_3$ layered phase in contrast with the compositions described herein.

It is believed that the $Li_2MnO_3$ is generally unstable with respect to phase transitions and other irreversible changes during cycling in a lithium battery. The phase transition can be associated with a large irreversible capacity loss on the first charge as well as instabilities during longer term cycling. Specifically, it has been proposed that the layered $Li_2MnO_3$ can react during an initial charge to release molecular oxygen with an associated release of 2 Li ions as indicated in equation (1):

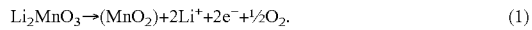
$Li_2MnO_3 \rightarrow (MnO_2)+2Li^++2e^-+\frac{1}{2}O_2.$ (1)

Upon discharge, the $(MnO_2)$ composition takes up a single lithium ion and a single electron to form $(LiMnO_2)$ so that there is an overall significant decrease in capacity due to the irreversible reaction of the material during the initial charge. The product composition is written as $(MnO_2)$ because it is not completely clear what this material is, although it is believed that $(LiMnO_2)$ formed upon lithium intercalation is a spinel phase or becomes a spinel phase with cycling. While Eq. (1) is balanced if $(MnO_2)$ is actually $MnO_2$, it is not clear if this is the precise reaction, although oxygen release is observed corresponding to a reduction of the metal. One possible explanation of the results is that $MnO_2$ is formed that intercalates lithium during battery discharge to form a lithium manganese oxide that then converts to a spinel upon lithiation and/or over time with cycling. The materials in principle can undergo other irreversible changes that may coincide with the initial charge step, such as a decomposition reaction $Li_2MnO_3 \rightarrow MnO_2+Li_2O$. Such a decomposition reaction does not result in a measured irreversible capacity loss since no electrons are generated that would be measured during the initial charge, but such a reaction to form inert lithium oxide could result in a loss of reversible capacity relative to the theoretical capacity for a particular weight of material. The initial reactions involving the active material are not completely understood. However, as described further below, evidence suggests that some of the $Li_2MnO_3$ phase may cycle stably and coatings can significantly stabilize the materials during cycling.

Evidence suggests that the lithium extraction from $Li_2MnO_3$ takes place efficiently at voltages above roughly 4.4 volts. A corresponding reactions such as the reaction schematically represented in Eq. (1), can take place along with the lithium extraction. Thus, with the lithium rich layered-layered material, during the first cycle charge above roughly 4.2V, decomposition of a $Li_2MnO_3$ component into a high capacity material can lead to oxygen loss and a significant irreversible capacity loss attributable to the positive electrode active material. However, if there are significant amounts of $Li_2MnO_3$ that are not activated in a high voltage charge, the material necessarily remains a relatively lower capacity active material. While large irreversible capacity losses are observed with the lithium rich active materials, it is possible in some formulations, such as coated materials, that at least some of the $Li_2MnO_3$ phase may cycle relatively stably. Activation of layered-layered mixed phase materials is described further in copending U.S. patent application Ser. No. 13/213,756, now U.S. Pat. No. 8,928,286 to Amiruddin et al., entitled "Very Long Cycling of Lithium Ion Batteries With Lithium Rich Cathode Materials," incorporated herein by reference.

It has been found that the presence of supplemental lithium in a lithium ion battery can significantly stabilize a resulting spinel phase noted above as $(MnO_2)$, but further gradual phase transitions result in an undesirable drop in average voltage with cycling. This stabilization is described in copending U.S. patent application Ser. No. 12/938,073, now published U.S. patent application 2012/0107680 to Amiruddin et al., entitled "Lithium Ion Batteries With Supplemental Lithium," incorporated herein by reference. Thus, a significant degree of stabilization can be achieved with supplemental lithium.

Coatings have been found to also provide significant stabilization of the multiple phase complex lithium mixed metal oxides. As discussed below, several different coating materials, including metal oxide, metal halides and metal phosphate, that are believed to be electrochemically inert, have been found to significantly stabilize the materials with respect to first cycle activation and cycling. With respect to the first cycle stabilization, coatings have been found in some embodiments to provide significant decrease in irreversible capacity loss as well as to significantly increase the specific discharge capacity even though inactive weight is added by the coating. Coatings have been found to continue to provide these enhancements for the improved compositions described herein even though the uncoated materials already exhibit significant stabilities. The coatings are also expected to significantly reduce fade with long term cycling.

Crystal structures can be evaluated by powder x-ray diffraction (xrd), and powder xrd is an established method for evaluating the crystallinity of inorganic powders. Following convention in the art, plots of scattering intensity are presented as a function of the scattering angle 2θ. The complication of examining the complex lithium metal oxides is that the different crystalline phases have very similar lattice constants to each other so that the changes in the xrd spectrum are subtle. The presence of a spinel crystalline phase is examined through an analysis of the diffraction peaks at scattering angles from 36-39 degrees. As described in more detail below, a parameter, the R factor, can be defined based on the intensities of three peaks in this region, and values of the R factor greater than a cut off value can be used to suggest the presence of a spinel phase that contributes significantly to the material's electrochemistry. Furthermore, an intense scattering peak at a scattering angle of about 36-37 exhibits broadening toward lower scattering angles indicating a loss of layered (i.e., hexagonal) ordering consistent with the growth of a spinel phase. A selected way to measure this broadening herein is the full width of the scattering peak at one tenth of the maximum intensity, which in some embodiments is at least about 0.5 degrees.

It is useful to note that during charge/discharge measurements, the specific capacity of a material depends on the rate of discharge. The maximum specific capacity of a particular material is measured at very slow discharge rates. In actual use, the actual specific capacity is less than the maximum due to discharge at a finite rate. More realistic specific capacities can be measured using reasonable rates of discharge that are more similar to the rates during use. For low to moderate rate applications, a reasonable testing rate involves a discharge of the battery over three hours. In conventional notation this is written as C/3 or 0.33 C, and other charge and discharge rates can be written in this notation.

The improved compositions described herein exhibit high specific capacities while having a very low irreversible capacity loss relative to high capacity layered-layered compositions. Specifically, the specific capacity generally is at least about 235 mAh/g when discharged at a rate of C/3 from 4.6V to 2V. The irreversible capacity loss can be significantly less than ten percent of the initial charge capacity. In addition to the very surprising low irreversible capacity loss, the high rate capacity is also very surprising. The specific discharge capacity at a high rate of 2 C from 4.6V to 2V can be at least about 190 mAh/g.

Carbonate and hydroxide co-precipitation processes have been performed for complex lithium metal oxide materials, and a carbonate co-precipitation process is described in the examples for the mixed phase materials described herein. In the general coprecipitation process, a solution is formed from which a metal hydroxide or carbonate is precipitated with the desired metal stoichiometry. The metal hydroxide or carbonate compositions from co-precipitation can be subsequently heat-treated to form the corresponding metal oxide composition with appropriate crystallinity. The lithium cations can either be incorporated into the initial co-precipitation process, or the lithium can be introduced in a solid state reaction during or following the heat treatment to form the oxide compositions from the hydroxide or carbonate compositions. As described in more detail below, the co-precipitation processes can be adapted to provide lithium metal oxide powders with a relatively high tap density, which can be exploited with respect to improved performance for a specific battery volume.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials having good properties with respect to specific capacity, tap density, and cycling can provide improved performance for consumers, especially for medium current applications.

The batteries described herein are suitable for vehicle applications. In particular, these batteries can be used in battery packs for hybrid vehicles, plug-in hybrid vehicles and purely electric vehicles. These vehicles generally have a battery pack that is selected to balance weight, volume and capacity. Thus, due to the high capacity of the batteries described herein, a battery pack that yields a desired amount of total power can be made in a reasonable volume, and these battery packs can correspondingly achieve the excellent cycling performance.

Positive Electrode Active Materials

The positive electrode active materials comprise multiphase lithium metal oxide compositions with a range of stoichiometry that are designed to yield surprisingly good performance characteristics. It is believed that at least some of the compositions form a composite crystal structure with layered-layered-spinel domains. In embodiments of particular interest, the lithium metal oxide compositions comprise Ni and Mn cations an optional range of cobalt cations with an optional metal dopant. The compositions are generally relatively manganese rich relative to the overall non-lithium metal composition, and the high manganese content is believed to favorably contribute to the formation of the desired phases as well as the desired electrochemical properties. As described herein, the metal stoichiometry can be determined using analytical techniques on the product compositions, such as the use of inductively coupled plasma-atomic emission spectroscopy.

The compositions of particular interest can be represented by the formula $Li_{1+a}Ni_bCo_cMn_dM_eO_x$, with $-0.05 \leq a \leq 0.14$, $0.1 \leq b \leq 0.25$, $0 \leq c \leq 0.2$, $0.45 \leq d \leq 0.8$, $0 \leq e \leq 0.02$, $a+b+c+d+e=1$, $(1+a)/(b+c+d+e) \leq 1.325$ and M is a metal element different from Li, Ni, Co and Mn. Note that c and e can be zero, and e has a relatively low upper cutoff corresponding to its role as a dopant. The amount of oxygen is not directly specified since this value is not measured or known. But the quantity x adjusts according to the oxidation state of the metal elements and is believed to be near a value of 2 in general. According to the above formula, the amount of lithium relative to the reference amount indicated by "a" can be a small negative value or a moderate positive number, and in some embodiments, the value of "a" is positive, in further embodiments $0.025 \leq a \leq 0.13$, in additional embodiments $0.05 \leq a \leq 0.125$ and in other embodiments $0.065 \leq a \leq 0.115$. The amount of nickel can be selected in some embodiments according to $0.125 \leq b \leq 0.225$ and in further embodiments $0.14 \leq b \leq 0.2$. The amount of cobalt can be selected in some embodiment according to $0.05 \leq c \leq 0.185$ and in further embodiments $0.075 \leq c \leq 0.175$. The amount of manganese can be selected in some embodiments according to $0.5 \leq d \leq 0.75$ and in further embodiments $0.525 \leq d \leq 0.65$. In some embodiments, the composition does not have a dopant ($e \approx 0$) and $0.125 \leq b \leq 0.20$, $0.075 \leq c \leq 0.175$, $0.5 \leq d \leq 0.65$. The amount of dopant element M can be selected in some embodiments according to $0 \leq e \leq 0.015$ and in further embodiments $0.001 \leq e \leq 0.01$. A person of ordinary skill in the art will recognize that additional ranges of formula parameters within the explicit ranges above are contemplated and are within the present disclosure. The dopant element is a metal element different from Li, Ni, Co and Mn. Dopant elements of particular interest include, for example, Mg, Sr, Ba, Cd, Zn, Al, Ga, B, Zr, Ti, Ca, Ce, Y, Nb, Cr, Fe, V, or combinations thereof. As used herein, the notation "$\leq$" indicated a cutoff of a range that is approximate to be consistent with experimental error associated with the measurement of the corresponding quantity that necessarily follows from the measurement of any non-integer value.

As noted above, the compositions are believed to form multiple phase crystalline structures. In some embodiments, the compositions can form crystalline phases with layered-layered-spinel phases. The amounts of lithium and manganese in particular are believed to influence significantly the allocation of the metal elements into the different phases. Thus, ratios of quantities of lithium to the total non-lithium metal and to manganese are useful parameters to characterize the compositions. As noted in the formula above, the compositions can have a ratio of lithium to non-lithium metal $(1+a)/(b+c+d+e) \leq 1.34$, in further embodiments $(1+a)/(b+c+d+e) \leq 1.33$, in other embodiments $(1+a)/(b+c+d+e) \leq 1.325$ and in additional embodiments $(1+a)/(b+c+d+e) \leq 1.32$. Another ratio of interest is the ratio of lithium to manganese, and in some embodiments $(1+a)/d \leq 2.1$ and in further embodiments $(1+a)/d \leq 2.05$. A person of ordinary skill in the art will recognize that additional ranges of ratios within the explicit ranges above are contemplated and are within the present disclosure.

The complex lithium metal oxides can be characterized using powder x-ray diffraction. The resulting diffractogram is correspondingly complex, and the different phases have similar diffractograms due to similar lattice constants of the phases. The overall diffractogram has peaks diagnostic of a hexagonal layered lithium metal oxide. A relatively small peak of scattering intensity at a scattering angle of $2\theta$ around 20-21 degrees suggests the presence of a layered $Li_2MnO_3$ phase. Diffractogram peaks at scattering angles from about $2\theta$ between 36 and 39 degrees correspond with the 101, 006 and 102 lattice parameter of a layered crystal structure. The presence of a spinel phase results in a broadening of the 101 scattering peak and a change in the intensity ratios of the three scattering peaks. An R-factor has been defined as the ratio of scattering intensities $[I_{006}+I_{102}]/I_{101}$, which decreases for a highly crystalline layered crystal structure. As a spinel phase contributes to the scattering intensity for scattering angles from 36 to 39, the R-factor increases, and a shoulder grows on the 101 peak at low scattering angles. In some embodiments, the R-factor is at least about 0.285 and in further embodiments at least about 0.29. Similarly, the broadening toward lower scattering angles of the 101 peak at a scattering angle of about 37 degrees can be evaluated based on the full width of the scattering peak at one tenth of the scattering maximum. The broadening full width at one tenth intensity can be at least about 0.5 degrees, in further embodiments at least about 0.55 degrees and in other embodiments from about 0.6 degrees to about 1.2 degree. Differential capacity plots described below confirm the presence of a significant spinel phase for some of the compositions. A person of ordinary skill in the art will recognize that additional ranges of scattering parameters within the explicit ranges above are contemplated and are within the present disclosure.

The presence of multiple phases is further consistent with a comparison of crystallite sizes with particle sizes. The materials described in the examples had a volume average particle size of about 11-12 microns, as determined by laser based dynamic light scattering in a dispersion of the particles. The crystallite sizes as determined by x-ray diffraction for nanoscale crystallites that result in line broadening, and the Scherrer equation can be used to determine crystallite size. The crystallite sizes for the materials produce in the examples below are 40-55 nanometers. While the fact that the particles are polycrystalline does not directly indicate that the crystallites have different phase structures, these observations are internally consistent with all of the available date.

Synthesis Methods

Synthesis approaches described herein can be used to form multiphase complex lithium rich positive electrode active materials with high values of specific capacity and a relatively high tap density along with low values of irreversible capacity loss. The synthesis methods have been adapted for the synthesis of compositions with the formula $Li_{1+a}Ni_bCo_cMn_dM_eO_x$ and the desired parameter ranges, as described above. The synthesis approaches are also suitable for commercial scale up. Specifically, co-precipitation process can be used to synthesize the desired lithium rich positive electrode materials with desirable results.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the optional dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material.

The synthesis methods are suitable for the formation of particles of the active composition with a high tap density. In particular, the tap density can be in some embodiments at least about 1.8 g/cc, in further embodiments at least about 1.9 g/cc and in additional embodiments at least about 1.95 g/cc. A person of ordinary skill in the art will recognize that additional ranges of tap density are contemplated and are within the present disclosure. Generally, a higher tap density can be advantageously used to obtain a high electrode density without sacrificing the performance of the material if the high tap density material has desirable performance. For fixed volume applications such as batteries for electronic devices, high tap density and therefore high overall capacity of the battery is of particular significance. Generally, tap density is the apparent powder density obtained under stated conditions of tapping. The tap density of a positive electrode active material described herein can be measured by using graduated measuring cylinders on a commercially available tap machine with pre-determined tapping parameters. Particular tapping conditions are described explicitly in the examples.

Further details of the hydroxide co-precipitation process are described in published U.S. patent application 2010/0086853 to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in 2010/0151332 to Lopez et al. entitled "Positive Electrode Materials for High Discharge Capacity Lithium Ion Batteries", incorporated herein by reference.

Coatings and Methods for Forming the Coatings

Inorganic coatings, such as metal halide coatings or metal oxide coatings, have been found to significantly improve the performance of complex lithium metal oxide electrode active materials, although the coatings are believed to be inert with respect to battery cycling. In particular, the cycling properties of the batteries formed from appropriately coated lithium metal oxide have been found to significantly improve from the uncoated material. Additionally, the specific capacity of the batteries also shows desirable properties with stabilizing coatings, and the irreversible capacity loss of the first cycle of the battery can be reduced. As discussed above, first cycle irreversible capacity loss of a battery is the difference between the charge capacity of the new battery and its first discharge capacity. For complex lithium metal oxides generally, a significant portion of the first cycle irreversible capacity loss can be attributed to the positive electrode material. For the layered-layered-spinel multiphase lithium metal oxides described herein, these advantageous properties from the coating are maintained, and in particular the first cycle irreversible capacity losses can be extremely low.

In the Examples below, performance properties are obtained for the active materials coated with a metal halide coating. The metal halide coatings provide for a modest increase in the specific capacity of the active material and a significant drop in the irreversible capacity loss, and the metal halide coatings can be expected to improve the longer term cycling properties of the positive electrode active materials.

With respect to metal oxide and metal halide coatings, a coating with a combination of metal and/or metalloid elements can be used for the coating compositions. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. Metal fluoride coatings are described generally in published PCT application WO 2006/109930A to Sun et al., entitled "Cathode Active Materials Coated with Fluorine Compound for Lithium Secondary Batteries and Method for Preparing the Same," incorporated herein by reference. It has been found that metal/metalloid fluoride coatings can significantly improve the performance of lithium rich layered compositions for lithium ion secondary batteries. See, for example, the '853 application and the '332 application cited above, as well as published U.S. patent application number 2011/0111298 (the '298 application) to Lopez et al., entitled "Coated Positive Electrode Materials For Lithium Ion Batteries," incorporated herein by reference. Desirable performance results for non-fluoride metal halide coatings have been described in copending U.S. patent application Ser. No. 12/888,131, now U.S. Pat. No. 8,663,849 to Venkatachalam et al., entitled "Metal Halide Coatings on Lithium Ion Battery Positive Electrode Materials and Corresponding Batteries," incorporated herein by reference. This patent application also discusses methods for formation of desired metal halide coatings.

An increase in capacity and a reduction in irreversible capacity loss were noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. The use of a $LiNiPO_4$ coating to obtain improved cycling performance is described in an article to Kang et al. "Enhancing the rate capability of high capacity $xLi_2MnO_3$ (1-x)$LiMO_2$ (M=Mn, Ni, Co) electrodes by Li—Ni—$PO_4$ treatment," Electrochemistry Communications 11, 748-751 (2009), incorporated herein by reference, and this article can be referenced generally with respect to the formation of metal phosphate coatings. Desirable properties of metal oxide coatings on lithium rich positive electrode active materials are described further in published U.S. patent application 2011/0076556A to Karthikeyan et al., entitled "Metal Oxide Coated Positive electrode Materials for Lithium-Based Batteries," incorporated herein by reference.

In some embodiments, the coating improves the specific capacity of the batteries even though the coating itself is not electrochemically active. However, the coatings also influence other properties of the active material, such as the average voltage, thermal stability and impedance. The selection of the coating properties can incorporate additional factors related to the overall range of properties of the material as described further in the references cited in this section.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of coating materials to achieve desired improvement in battery performance can be related to the particle size and surface area of the uncoated material. Further discussion of the effects of coating thickness on the performance properties for coated lithium rich lithium metal oxides is found in the '298 application cited above.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, NH$_4$F can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Lithium Based Batteries

Lithium based batteries generally comprise a positive electrode, a negative electrode, a separator between the negative electrode and the positive electrode and an electrolyte comprising lithium ions. The electrodes are generally associated with metal current collectors. Lithium batteries refer to batteries with elemental lithium or alloys thereof, such as a lithium foil, in the negative electrode. Lithium ion batteries refer to batteries in which the negative electrode active material is a material that takes up lithium during charging and releases lithium during discharging. Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The stack of electrodes with their associated current collectors and separator are generally placed within a container with the electrolyte. The basic battery structures and compositions are described in this section.

The nature of the negative electrode intercalation/alloying material influences the resulting voltage of the battery since the voltage is the difference between the half cell potentials at the cathode and anode. Suitable negative electrode (anode) lithium intercalation/alloying compositions can include, for example, graphite, synthetic graphite, coke, fullerenes, other graphitic carbons, niobium pentoxide, tin alloys, silicon, titanium oxide, tin oxide, and lithium titanium oxide, such as Li$_x$TiO$_2$, 0.5<x≤1 or Li$_{1+x}$Ti$_{2-x}$O$_4$, 0≤x≤⅓. The graphitic carbon and metal oxide negative electrode compositions take up and release lithium through an intercalation or similar process. Silicon and tin alloys form alloys with the lithium metal to take up lithium and release lithium from the alloy to correspondingly release lithium. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference. Desirable elemental silicon based negative electrode active materials are described in published U.S. patent application number 2011/0111294 filed on Nov. 3, 2010 to Lopez et al., entitled "High Capacity Anode Materials for Lithium Ion Batteries," incorporated herein by reference. Desirable silicon oxide based negative electrode active materials are described in copending U.S. patent application Ser. No. 13/108,708 filed on May 16, 2011, now published application 2012/0295155 to Deng et al., entitled "Silicon Oxide Based High Capacity Anode Materials for Lithium Ion Batteries," incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyimides, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, lithium bis-oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent application 2011/0136019 filed on Dec. 4, 2009 to Amiruddin et al. (the '019 application), entitled "Lithium Ion Battery With High Voltage Electrolytes and Additives," incorporated herein by reference. Also, electrolytes designed for both high voltage operation and low temperature operation are described in copending U.S. patent application Ser. No. 13/325,367, now published application 2013/0157147 to Li et al., entitled "Low Temperature Electrolyte for High Capacity Lithium Based Batteries," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used. Pouch batteries can be constructed as described in published U.S. patent application 2009/0263707 to Buckley et al, entitled "High Energy Lithium Ion Secondary Batteries", and copending U.S. patent application Ser. No. 13/195,672 filed on Aug. 1, 2011, now published application 2012/0028105 to Kumar et al., entitled, "Battery Packs for Vehicles and High Capacity Pouch Secondary Batteries for Incorporation Into Compact Battery Packs," both of which are incorporated herein by reference.

Battery Performance

Performance results obtained from batteries formed with the multiphase positive electrode materials described herein confirm the ability to significantly lower the first cycle irreversible capacity loss without sacrificing the performance of the materials with cycling. In particular, the compositions exhibit high specific capacities at both low and high discharge rates. Performance of the materials can be evaluated at low numbers of cycles based on an elemental lithium negative electrode. It is expected that the materials can exhibit very good cycling properties at large numbers of cycles when incorporated into a lithium ion battery, and initial cycling results are encouraging. Differential capacity plots provide evidence of a spinel phase. While the spinel phase tends to lower the average voltage over the full voltage range of the material, the strong objective of having a stable average voltage can be significantly more relevant than having an initial higher average voltage.

As noted above, the irreversible capacity loss is the difference between the first charge capacity and the first discharge capacity. The materials described herein can have a significantly reduced irreversible capacity loss relative to high capacity layered-layered positive electrode active materials. This reduction can be associated with a decrease in the initial specific charge capacity, which is consistent with a relative reduction in the lithium contribution relative to the remaining metal elements. The specific discharge capacities remain very high. Stabilizing coatings are found to further significantly reduce the irreversible capacity loss. If the irreversible capacity loss is measured with an elemental lithium counter electrode, all of the irreversible capacity loss can be attributed to the positive electrode. In some embodiments, the irreversible capacity when cycled from 4.6V to 2V loss can be no more than about 45 mAh/g, in further embodiments no more than about 40 mAh/g, in some embodiments no more than about 30 mAh/g, in additional embodiments no more than about 27 mAh/g, and in further embodiments no more than about 25 mAh/g. With respect to percentages, the irreversible capacity loss can be no more than about 12.5% of the first charge capacity, in further embodiments no more than about 11%, in other embodiments no more than about 10% and in additional embodiments no more than about 8% of the first cycle charge capacity. The low irreversible capacity loss can be obtained while still obtaining a high value for the specific discharge capacity, and the extremely low values of irreversible capacity loss are very surprising at such high values of specific discharge capacity. A person of ordinary skill in the art will recognize that additional ranges of absolute and percent irreversible capacity losses within the explicit ranges above are contemplated and are within the present disclosure. The low amounts of irreversible capacity loss can result in a correspondingly low amount of gas discharge and a reduction in negative electrode capacity, which can be significant factors for cost reduction in commercial battery production and increasing the capacity for a given weight and size of a larger format battery, such as an electric vehicle battery.

In some embodiments, the batteries can exhibit a specific discharge capacity of at least about 230 mAh/g at a discharge rate of C/3 from 4.6V to 2V, in further embodiments at least about 240 mAh/g and in additional embodiments at least about 245 mAh/g at a rate of C/3 from 4.6V to 2V at a 5th cycle. The batteries exhibit excellent high rate discharge capacities. In particular, the positive electrode active materials can have a specific discharge capacity of at least about 170 mAh/g at a rate of 2 C from 4.6V to 2V, in further embodiments at least about 175 mAh/g, in other embodiments at least about 180 mAh/g and in additional embodiments at least about 190 mAh/g at a discharge rate 2 C from 4.6V to 2V at the 9th cycle. The high rate performance can also be expressed as a ratio of the 2 C rate at the 9th cycle divided by the C/10 rate at the second cycle, and the ratio of the 2 C specific capacity divided by the C/10 capacity can be at least about 0.69, in further embodiments at least about 0.7 and in other embodiments at least about 0.725.

With respect to cycling stability, the average voltage has been found to be very stable with cycling, even at high rates. Specifically, the average voltage at the 50th cycle relative to the 9th cycle when cycled at a rate of 2 C can be at least about 92%, in further embodiments at least about 93% and in additional embodiments at least about 94% of the 9th cycle average voltage at the 50th cycle when discharged at a rate of 2 C. A person of ordinary skill in the art will recognize that additional ranges within the explicit ranges above of average voltage stability are contemplated and are within the present disclosure.

Differential capacity plots exhibit behavior consistent with the presence of spinel crystalline phase. In particular, the spinel phase is expected to exhibit a discharge capacity peaking between 2-3 volts. The differential capacity plots exhibit significant discharge capacity under 3 volts, and materials expected to have a greater contribution from a spinel phase due to a reduced ratio of lithium to other metals exhibit relatively greater portion of the capacity between 2-3 V. Some of the materials exhibit a clear local peak in discharge differential capacity near 2.5V-2.7V. This spinel contribution can result in a moderate decrease in the initial average voltage, but improved stability of the average voltage with cycling is extremely desirable, especially for certain applications, such as vehicle applications.

EXAMPLES

The coin cell batteries tested in Examples 1-4 were all performed using coin cell batteries produced following a procedure outlined here. The powders compositions were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Honeywell—Riedel-de-Haen) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film using a doctor's blade coating process.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. The dried electrode comprised at least about 75 weight percent active metal oxide, at least about 1 wt % carbon black, at least about 1 weight percent graphite, and at least about 2 weight percent polymer binder.

The positive electrode was placed inside an argon filled glove box for the fabrication of the coin cell batteries. Lithium foil (FMC Lithium) having thickness of 125 micron was used as a negative electrode. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

The electrolyte was a high voltage electrolyte as described in U.S. Patent Application No. 2011/0136019 to Amiruddin et al. entitled: "Lithium ion battery with high voltage electrolytes and additives", incorporated herein by reference. Based on these electrodes and the chosen electrolyte, the coin cell batteries were completed with separator and hardware as described above for the batteries with the lithium foil electrode. The batteries were cycled between 4.6 V and 2V.

Example 1

Formation of Cathode Active Materials Via Carbonate Co-Precipitation

This example demonstrates the formation of four cathode active compositions using a carbonate co-precipitation process. Stoichiometric amounts of metal sulfates ($NiSO_4 \cdot xH_2O$, $CoSO_4 \cdot xH_2O$, & $MnSO_4 \cdot xH_2O$) were dissolved in distilled water to form a metal sulfate aqueous solution. Separately, an aqueous solution containing $Na_2CO_3$ and $NH_4OH$ was prepared. For the formation of the samples, the two solutions were gradually added to a reaction vessel to form metal carbonate precipitates. The reaction mixture was stirred, and the temperature of the reaction mixture was kept at a temperature between room temperature and 80° C. The pH of the reaction mixture was in the range from 6-9. In general, the aqueous metal sulfate solution had a concentration from 1M to 3M, and the aqueous $Na_2CO_3/NH_4OH$ solution had a $Na_2CO_3$ concentration of 1M to 4M and a $NH_4OH$ concentration of 0.2-2M. The metal carbonate precipitate was filtered, washed multiple times with distilled water, and dried at 110° C. for about 16 hrs to form a metal carbonate powder. Specific ranges of reaction conditions for the preparation of the samples are further outlined in Table 1.

TABLE 1

| Reaction Process Condition | Values |
| --- | --- |
| Reaction pH | 6.0-9.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ (precipitating agent) | 1-4M |
| Concentration of $NH_4OH$ (chelating agent) | 0.2-2M |
| Flow rate of the metal salts | 1-100 mL/min |
| Flow rate of $Na_2CO_3$ & $NH_4OH$ | 1-100 mL/min |

Different amounts of $Li_2CO_3$ powder were used to produce the four cathode active materials with the same dried metal carbonate powder. Specifically, an appropriate amount of $Li_2CO_3$ powder was combined with the dried metal carbonate powder and thoroughly mixed by a Jar Mill, double planetary mixer, or dry powder rotary mixer to form a homogenous powder mixture. A portion, e.g. 5 grams, of the homogenized powders is calcined followed by an additional mixing step to further homogenize the powder formed. The further homogenized powder was again calcined to form the lithium composite oxide as the cathode active material. Specific ranges of calcination conditions are further outlined in Table 2.

TABLE 2

|  | Calcination Process Condition | Values |
| --- | --- | --- |
| 1$^{st}$ Step | temperature | 400-800° C. |
|  | time | 1-24 hr |
|  | protective gas | Nitrogen or Air |
|  | Flow rate of protective gas | 0-50 scfh |
| 2$^{nd}$ Step | temperature | 700-1100° C. |
|  | time | 1-36 hr |
|  | protective gas | Nitrogen or Air |
|  | Flow rate of protective gas | 0-50 scfh |

The stoichiometry of the four cathode active compositions formed is analyzed by inductively coupled plasma (ICP)—atomic emission spectroscopy (AES) analysis and the results are shown in Table 3. Compositions 1-4 have very similar relative transition metal compositions within the desired ranges described herein, and the compositions differ from each other with respect to the lithium metal composition as indicated in the table. Although all composition are lithium rich, the lithium stoichiometry increased from composition 1 to composition 4, with composition 1 having the lowest Li/Me ratio of about 1.1881 and composition 4 having the highest Li/Me ratio of about 1.4038.

TABLE 3

| Composition | Li | Me* | Li/Me* | Size (nm) |
| --- | --- | --- | --- | --- |
| 1 | 1.086 | 0.914 | 1.188 | 44.29 |
| 2 | 1.119 | 0.881 | 1.270 | 47.09 |
| 3 | 1.136 | 0.863 | 1.316 | — |
| 4 | 1.168 | 0.832 | 1.404 | 53.58 |

*Me is the total transition metal in the composition, i.e. the sum of Ni, Co, and Mn.

Figure 2:
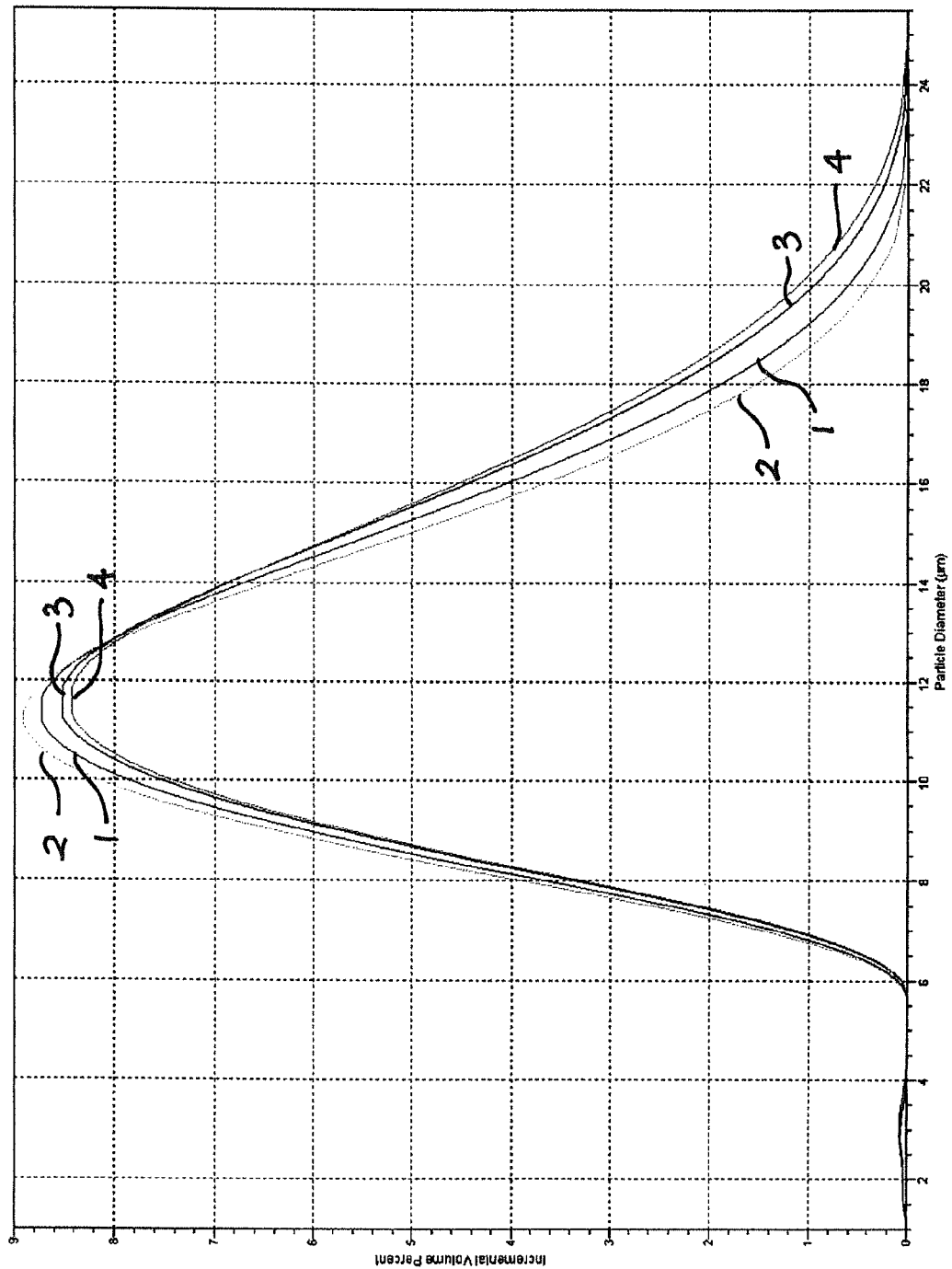
FIG. 2 is a plot of the incremental volume versus particle diameter for compositions 1-4 described in the Examples.

The particle size distribution of the compositions has been analyzed and the results are plotted in FIG. 2 obtain by dynamic light scattering with a dispersion of the particles in isopropyl alcohol using a Saturn DigiSizer® from Micromeritics. As shown in FIG. 2, the compositions comprise particles with $D_{50}$ values (median sizes based on volumes) of 11.6 microns, 11.7 microns, 11.4 microns, and 11.2 microns for compositions 1-4 respectively.

An AUTOTAP™ machine from Quantachrome Instruments was used to measure tap density of the samples. In a typical measurement process, a 4 gram quantity of sample powder was weighed out and placed in a graduated cylinder (100 mL). The cylinder was then mounted on a wheel of the AUTOTAP™ that taps at a tap rate of 260 $min^{-1}$ with a drop height of 3 mm. After 2000 taps the volume of the powder was determined by using the measurement markings on the graduated cylinder. The initial weight of the sample divided by the measured volume after tapping gives the tap density in g/cc ($cc=cm^3=mL$) of the sample. The tap densities of the compositions were measured to be around 2 $g/cm^3$ for all four compositions.

Figure 3A:
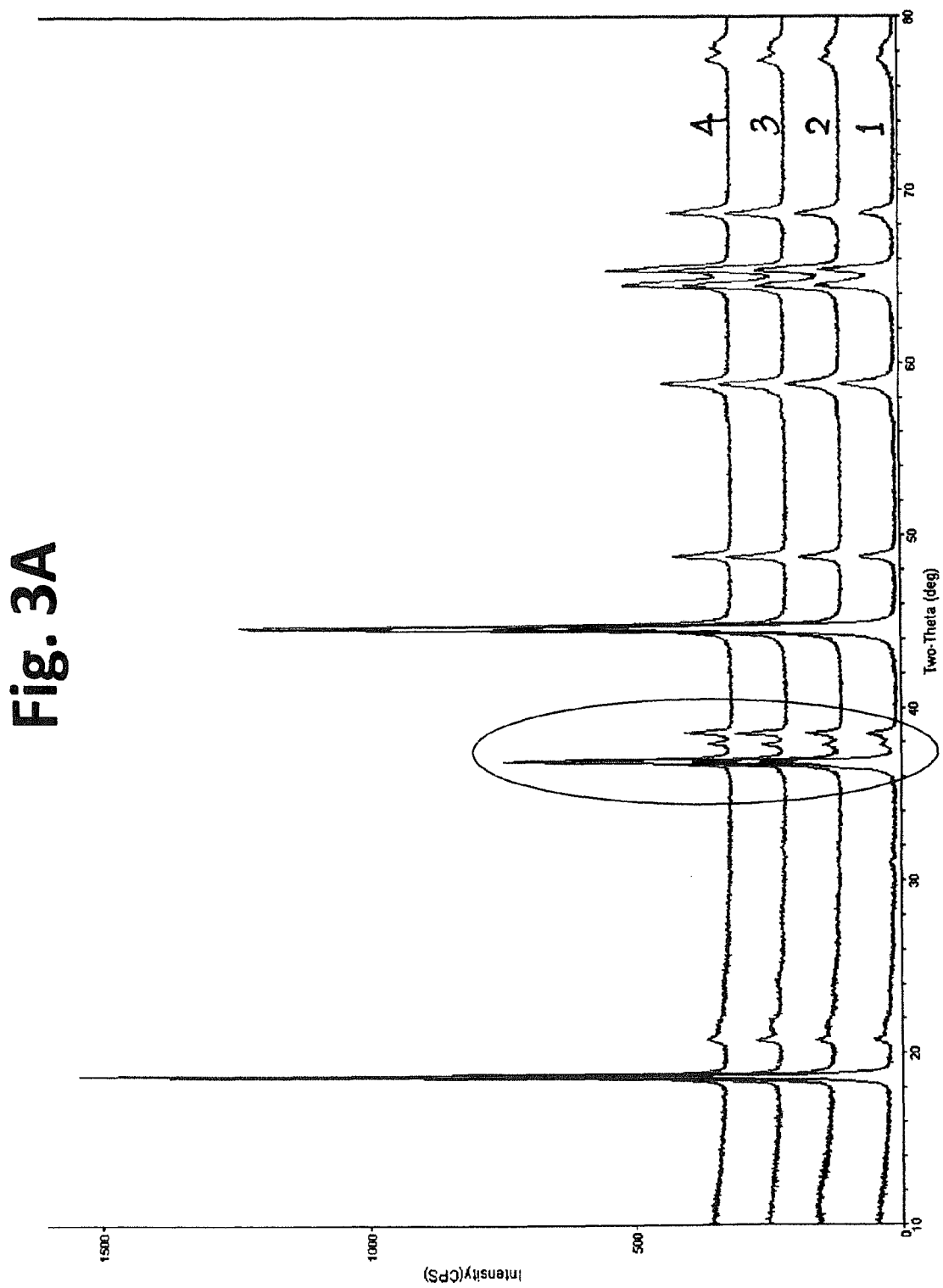
FIG. 3A is a plot of the XRD spectra of compositions 1-4.

The x-ray diffraction pattern of the composite powders is shown in FIG. 3A, in which the portion between 36 degree to 40 degree comprising peaks (101), (006), (102) is enlarged as FIG. 3B. As clearly shown in FIG. 3B, broadening of the peak (101) in the layered lattice is observed in compositions 1 and 2 that has lower Li/Me ratio, indicating the formation of spinel phase and the lack of hexagonal or layered ordering. R-factor, which is defined as $[I_{(006)}+I_{(102)}]/I_{(101)}$, of a composition is another indication to demonstrate the transition from hexagonal ordering to spinel phase with lower the R-factor indicating the presence of the hexagonal ordering. As shown in Table 4, compositions 1 and 2 with the lower lithium to metal ratio show higher R-factor indicating the disappearance of the hexagonal layered structure, which in turn supports the (101) peak broadening indicating the formation of spinel phase. Composition 2 in particular has especially high R factor compared to other compositions. The full widths at 1/10 maximum intensity for the 101 scattering peaks at 37 degrees scattering angle were 0.88, 0.70, 0.47 and 0.44 degrees for samples 1-4, respectively.

TABLE 4

| Composition | $I_{101}$ | $I_{006}$ | $I_{102}$ | R Factor |
|---|---|---|---|---|
| 1 | 244 | 20 | 54 | 0.303279 |
| 2 | 266 | 30 | 65 | 0.357143 |
| 3 | 445 | 36 | 91 | 0.285393 |
| 4 | 425 | 36 | 86 | 0.287059 |

The crystallite size of the compositions were also evaluated based on the general peak broadening observed in the XRD spectra, showing increased size from 44.29 mm, 47.09 nm, and 53.58 nm for compositions 1, 2, and 4 respectively. A similar trend is observed with respect to the surface area of the compositions, where the composition with the lower Li/Me ratio is showing the higher surface area.

Example 2

Battery Formation and Performance Testing Using Compositions from Example 1

Figure 4:
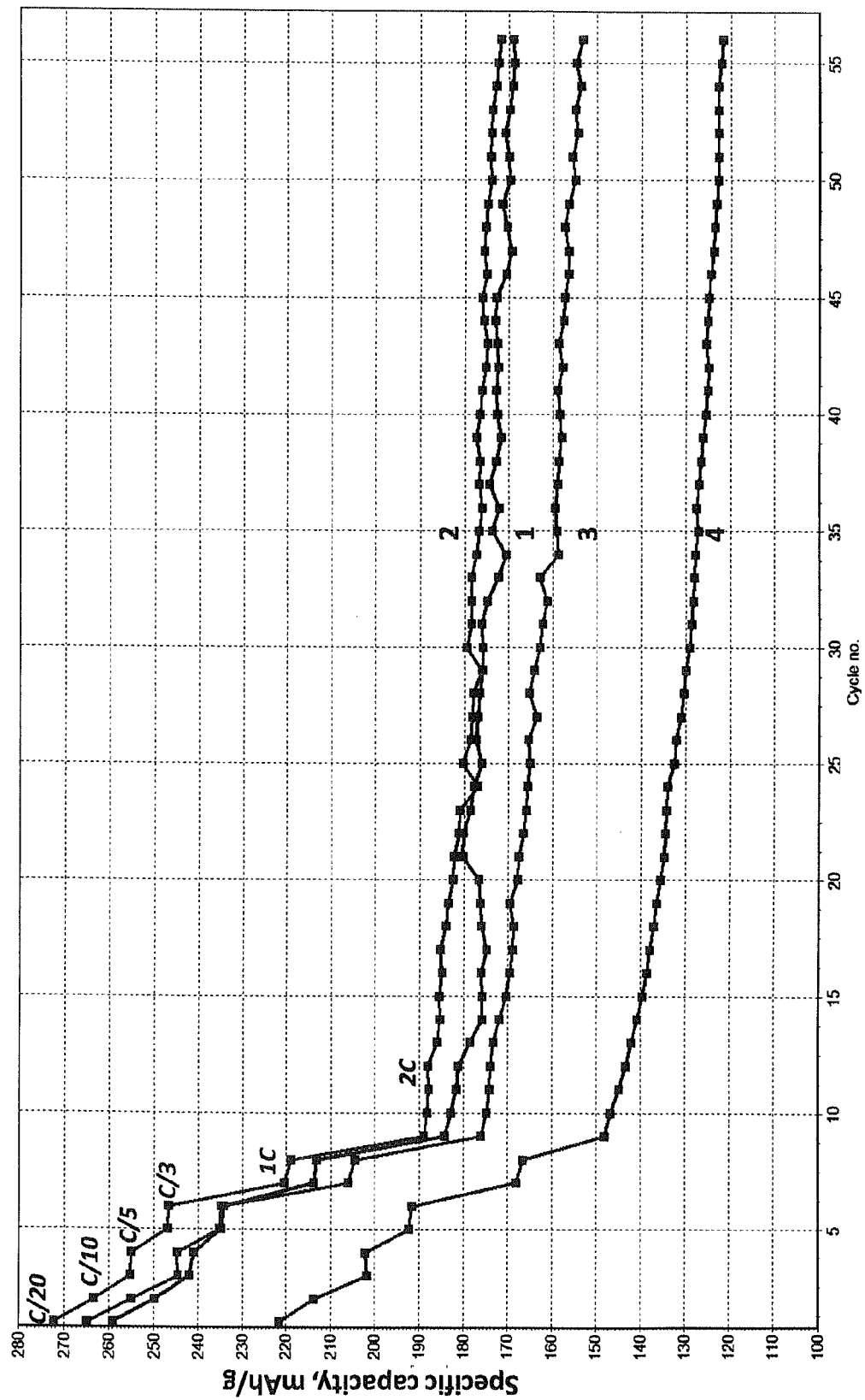
FIG. 4 is a plot of the specific capacity versus cycle numbers of the batteries formed from the compositions 1-4.
Figure 5:
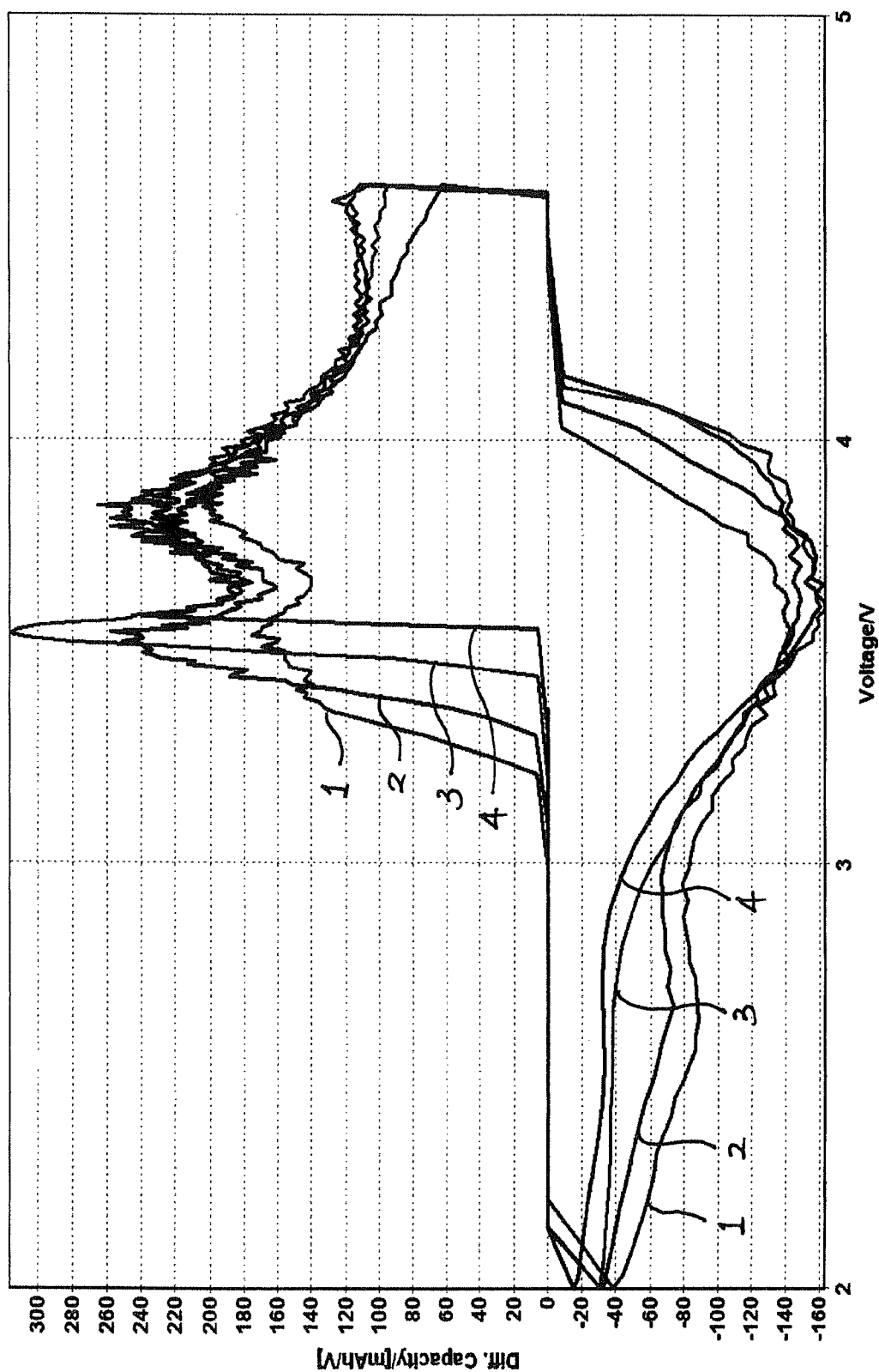
FIG. 5 is a plot of the differential capacity versus voltage of the compositions 1-4 at the first 2 C cycle.

This example demonstrates the formation of batteries using the compositions from example 1 and the cycling performance of these batteries. The compositions 1-4 from example 1 above were used to form coin cell batteries in duplicates with lithium counter electrode following the procedure outlined above. The coin cell batteries were then tested and the plots of average specific capacity of each composition versus cycle number of the coin cell batteries are shown in FIG. 4. The batteries were cycled by charging and discharging between 4.6V and 2V at a rate of C/20 for the first cycle, at a rate of C/10 for the second cycle, at a rate of C/5 for the third and the fourth cycles, at a rate of C/3 for the fifth and the sixth cycles, at a rate of 1 C for the seventh and the eighth cycles, and at a rate of 2 C for the subsequent cycles. The electrochemical data of the batteries is further summarized in Table 5 below, with each entry showing the duplicate data for each composition. Compositions 1 and 2 with lower Li/Me ratio appear to have better cycling performance compared to the compositions 3 and 4 with higher Li/Me ratio. Composition 2 in particular appears to have the best over all performance of all the tested compositions, including the lowest IRCL of 23 mAh/g. The differential capacity of the compositions at the first 2 C cycle was recorded and shown in FIG. 5. Compositions 1 and 2 with the lower Li/Me ratio appear to have more pronounced activity between 2.0 V and 3.0 V.

TABLE 5

| Composition | C/20* | C/20 | IRCL | C/10 | C/5 | C/3 | 1 C | 2 C |
|---|---|---|---|---|---|---|---|---|
| 1 | 283/285 | 258/259 | 25/26 | 249/250 | 241/242 | 240/241 | 212/214 | 181/184 |
| 2 | 295/295 | 272/272 | 23/23 | 264/264 | 255/256 | 247/248 | 221/221 | 189/187 |
| 3 | 303/301 | 265/267 | 38/34 | 255/257 | 245/247 | 235/237 | 206/209 | 176/179 |
| 4 | 311/310 | 223/222 | 88/88 | 215/214 | 203/202 | 193/192 | 169/168 | 147/148 |

*Both charge and discharge capacities at the rate C/20 are shown with the charge capacity annotated by the *.
All other data shown are discharge capacities with all the data having a unit of mAh/g.

Figure 6B:
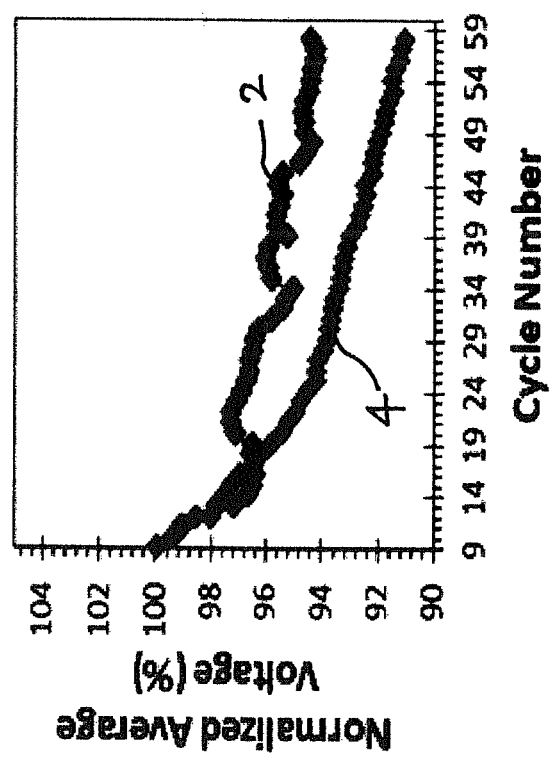
FIG. 6B is a plot of the normalized average voltage versus cycle numbers of batteries formed from compositions 2 and 4.
Figure 6A:
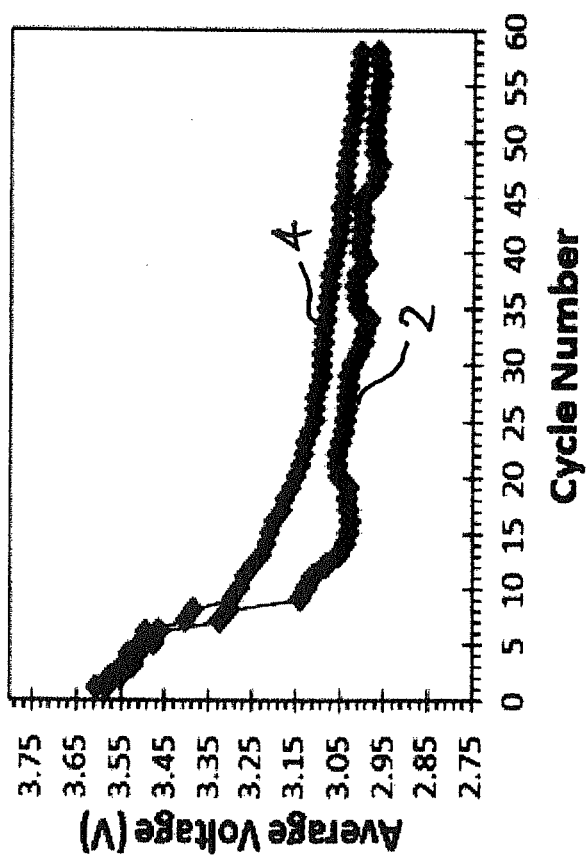
FIG. 6A is a plot of the average voltage versus cycle numbers of batteries formed from compositions 2 and 4.

The ratios of the 2 C specific capacities divided by the C/10 specific capacities are 0.756, 0.736, 0.693 and 0.688, respectively for compositions 1-4. The average voltage of coin cell batteries formed from compositions 2 and 4 were recorded and compared in FIGS. 6A and 6B. Interestingly, although composition 4 with the higher Li/Me ratio showed higher over all average voltage in FIG. 6A, composition 2 with the lower Li/Me ratio showed better voltage stability when the average voltage was normalized in FIG. 6B.

Example 3

Formation of $AlF_3$ Coated Cathode Active Materials

This example demonstrates the formation of aluminum fluoride ($AlF_3$) coated compositions using a solution-based method. For a selected amount of aluminum fluoride coating, appropriate amount of saturated solution of aluminum nitrate was prepared in an aqueous solvent. The particles of the composition were then added into the aluminum nitrate solution to form a mixture. The mixture was mixed vigorously for a period of time to homogenize. The length of mixing depends on the volume of the mixture. After homogenization, a stoichiometric amount of ammonium fluoride was added to the homogenized mixture to form aluminum fluoride precipitate while retaining the source of fluorine. Upon the completion of the precipitation, the mixture was stirred at 80° C. for 5 h. The mixture was then filtered and the solid obtained was washed repeatedly to remove any un-reacted materials. The solid was calcined in nitrogen atmosphere at 450° C. for 5 h to form the $AlF_3$ coated cathode active material. For example, composition 2 synthesized as described in example 1 was coated with 1.0 mole % aluminum fluoride using the process described in this example.

Example 4

Battery Formation and Performance Testing Using Coated Composition from Example 3

Figure 7:
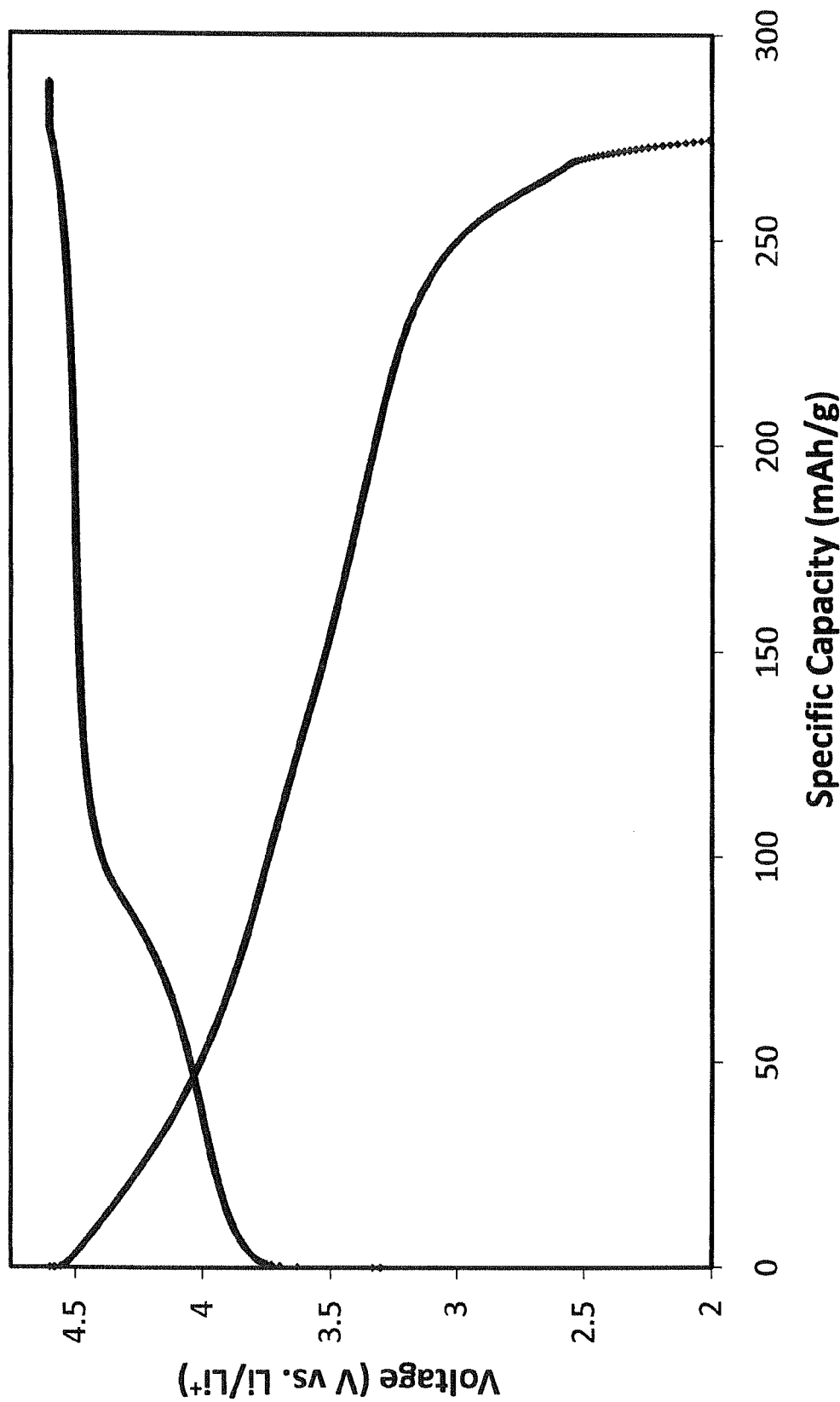
FIG. 7 is a plot of the voltage versus first cycle charge and discharge capacity of the metal halide coated composition 2.
Figure 8:
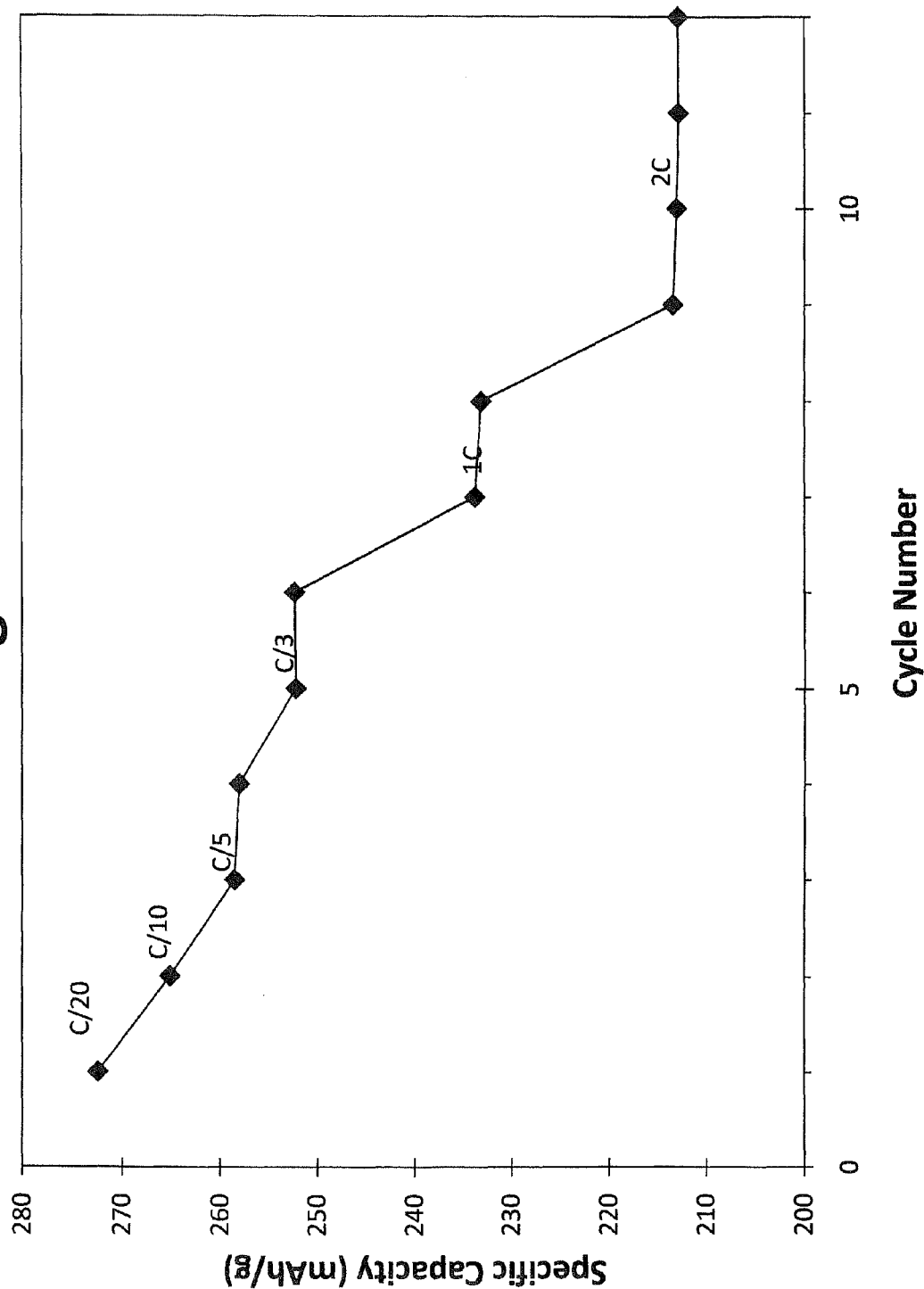
FIG. 8 is a plot of the specific capacity as a function of cycle number for the battery formed from the coated compositions 2.
Figure 9:
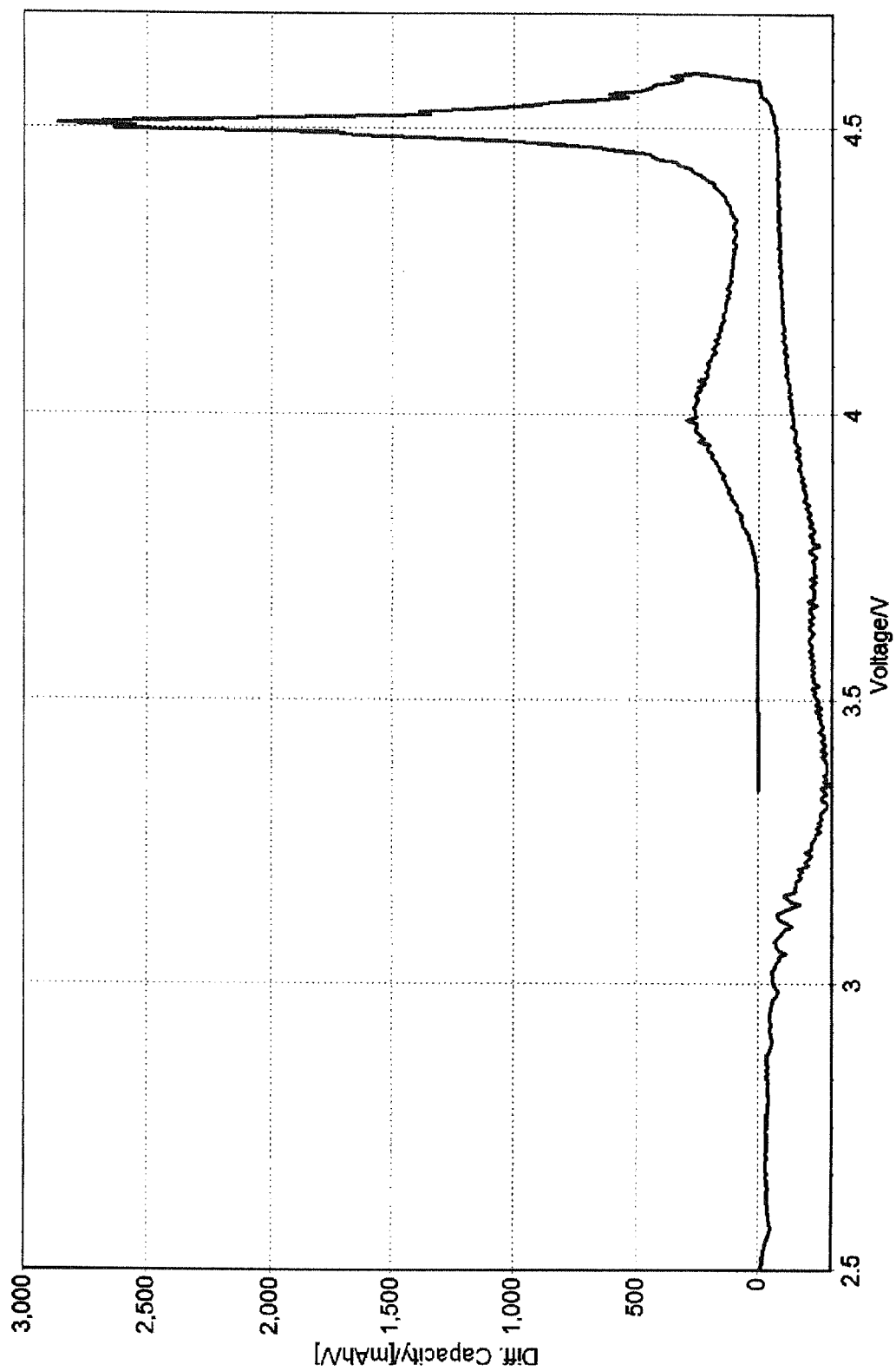
FIG. 9 is a plot of the first cycle differential capacity as a function of voltage for batteries with the metal halide coated composition 2.

This example demonstrates the formation of battery using the coated composition 2 from example 3 and the cycling performance of the battery. The aluminum fluoride coated composition 2 from example 3 was used to form coin cell battery following the procedure outlined above with a lithium metal counter electrode. The coin cell battery was tested, and the plot of voltage versus specific capacity of the coin cell battery at discharge rate of C/20 is shown in FIG. 7. The first cycle specific capacity of the battery at C/20 discharge rate is around 275 mAh/g. Specific capacity versus cycle life of the coin cell battery was also tested, and the results are shown in FIG. 8. The battery was cycled by charging and discharging between 4.6V and 2.0 V at a rate of C/20 for the first cycle, at a rate of C/10 for the second cycle, at a rate of C/5 for the third and the fourth cycles, at a rate of C/3 for the fifth and the sixth cycles, at a rate of 1 C for the seventh and the eighth cycles, and at a rate of 2 C for the subsequent cycles. The electrochemical data of the battery is further summarized in Table 6 below. The coated composition 2 has a very low IRCL of about 13 mAh/g, which accounts for only about 5% loss of the initial charge capacity. The first cycle differential capacity of the coated composition 2 was recorded and shown in FIG. 9.

TABLE 6

| Sample | C/20* | C/20 | IRCL | C/10 | C/5 | C/3 | 1 C | 2 C |
|---|---|---|---|---|---|---|---|---|
| AlFs coated composition 2 | 288 | 275 | 13 (5%) | 266 | 259 | 253 | 231 | 210 |

Both charge and discharge capacities at the rate C/20 are shown with the charge capacity annotated by the *. All other data shown are discharge capacities with all the data having a unit of mAh/g. The ratio of the 2 C specific capacity divided by the C/10 specific capacity is 0.764.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A composition having a formula $Li_{1+a}Ni_bCo_cMn_dM_eO_x$, with $-0.05 \le a \le 0.14$, $0.1 \le b \le 0.25$, $0 \le c \le 0.2$, $0.45 \le d \le 0.8$, $0 \le e \le 0.02$, $a+b+c+d+e=1$, $(1+a)/(b+c+d+e) \le 1.34$ and M is a metal element different from Li, Ni, Co and Mn, wherein the composition exhibits a first cycle irreversible capacity loss in a lithium battery of no more than about 10% of the first charge specific capacity when discharged at C/20 from 4.6V to 2V.

2. The composition of claim 1 wherein $(1+a)/(b+c+d) \le 1.3$.

3. The composition of claim 1 wherein $0.025 \le a \le 0.13$.

4. The composition of claim 1 wherein $0.05 \le a \le 0.125$.

5. The composition of claim 4 wherein e=0 and $0.125 \le b \le 0.20$, $0.075 \le c \le 0.175$, $0.5 \le d \le 0.65$.

6. The composition of claim 1 wherein the composition exhibits a 50th cycle specific discharge capacity of at least 150 mAh/g at a discharge rate of 2 C when discharged from 4.6V to 2V.

7. The composition of claim 1 wherein the composition exhibits an X-ray diffractogram with an R-value $([I_{(006)}+I_{(102)}]/I_{(101)}) \ge 0.285$ and a 5th cycle discharge specific capacity of at least about 225 mAh/g when discharged at a rate of C/3 from 4.6V to 2V.

8. The composition of claim 1 wherein the composition exhibits a 5th cycle discharge specific capacity of at least about 225 mAh/g when discharged at a rate of C/3 from 4.6V to 2V.

9. The composition of claim 1 wherein $0 \le e \le 0.02$ and M is Mg, Sr, Ba, Cd, Zn, Al, Ga, B, Zr, Ti, Ca, Ce, Y, Nb, Cr, Fe, V, or combinations thereof.

10. The composition if claim 1 further comprising a stabilizing coating.

11. The composition of claim 10 wherein the stabilizing coating comprises a metal halide.

12. The composition of claim 10 wherein the stabilizing coating comprises a metal oxide.

13. The composition of claim 10 wherein the composition exhibits a first cycle irreversible capacity loss in a lithium battery of no more than about 8% of the first charge specific capacity when discharged at C/20 from 4.6V to 2V.

14. The composition of claim 10 wherein the composition exhibits a specific discharge capacity of at least about 190 mAh/g at a discharge rate of 2 C when discharged from 4.6V to 2V.

15. A battery comprising a cathode comprising the composition of claim 1, an anode comprising a lithium alloying/intercalation composition, a separator between the anode and cathode and an electrolyte comprising an organic solvent and lithium ions.

16. A composition having a formula $Li_{1+a}Ni_bCo_cMn_dM_eO_x$, $-0.05 \le a \le 0.14$, $0.1 \le b \le 0.25$, $0 \le c \le 0.2$, $0.45 \le d \le 0.8$, $0 \le e \le 0.02$, $a+b+c+d+e=1$, $(1+a)/(b+c+d+e) \le 1.325$ and M is a metal element different from Li, Ni, Co, and Mn, wherein the composition exhibits an X-ray diffractogram indicating the presence of a spinel phase and a 5th cycle discharge specific capacity of at least about 225 mAh/g when discharged at a rate of C/3 from 4.6V to 2V.

17. The composition of claim 16 wherein $(1+a)/(b+c+d) \le 1.3$.

18. The composition of claim 16 wherein $0.05 \le a \le 0.125$, $0.125 \le b \le 0.20$, $0.075 \le c \le 0.175$, $0.5 \le d \le 0.65$.

19. The composition of claim 16 wherein the composition exhibits a 5th cycle discharge specific capacity of at least about 235 mAh/g when discharged from 4.6V to 2V at a rate of C/3.

20. The composition of claim 16 further comprising a stabilizing coating.

21. The composition of claim 16 wherein the composition exhibits a 50th cycle specific discharge capacity of at least about 150 mAh/g at a discharge rate of 2 C when discharged from 4.6V to 2V.

22. The composition of claim 16 wherein the composition exhibits a 50th cycle specific discharge capacity of at least about 160 mAh/g at a discharge rate of 2 C when discharged from 4.6V to 2V.

23. The composition of claim 16 wherein the composition exhibits an X-ray diffractogram with an R-value $([I_{(006)}+I_{(102)}]/I_{(101)}) \ge 0.285$.

24. The composition of claim 16 having a 5th cycle discharge specific capacity of at least about 225 mAh/g when discharged from 4.6V to 2V.

* * * * *